United States Patent [19]
Ueda

[11] Patent Number: 6,094,456
[45] Date of Patent: Jul. 25, 2000

[54] COMPACT IMAGE TRANSMISSION SYSTEM AND IMAGE REPRODUCING DEVICE CAPABLE OF REPRODUCING A DCT-BASED CODE AT A HIGH SPEED WITHOUT DETERIORATION OF PICTURE QUALITY

[75] Inventor: Hiroaki Ueda, Tokyo, Japan

[73] Assignee: NEC Corporation, Tokyo, Japan

[21] Appl. No.: 09/130,461

[22] Filed: Aug. 7, 1998

Related U.S. Application Data

[62] Division of application No. 08/921,472, Sep. 2, 1997, Pat. No. 5,847,767, which is a continuation of application No. 08/410,900, Mar. 27, 1995, abandoned.

[30] Foreign Application Priority Data

Mar. 25, 1994 [JP] Japan ................................. 6-562000
Aug. 5, 1994 [JP] Japan ................................. 6-184383

[51] Int. Cl.[7] ........................................... H04N 7/12
[52] U.S. Cl. ............................... 375/240; 348/845.2
[58] Field of Search ............................. 348/400, 401, 348/402, 428, 845.2, 423; 375/240; H04N 7/12

[56] References Cited

U.S. PATENT DOCUMENTS 5,539,466   7/1996   Igarashi et al. ..................... 348/401

*Primary Examiner*—Young Lee
*Attorney, Agent, or Firm*—Sughrue, Mion, Zinn, Macpeak & Seas, PLLC

[57] ABSTRACT

Processing is carried out assuming that a picture structure is fixed to I picture and P picture and that motion compensation value is fixed. header analyzing section 11 identifies the type of picture of input video code. In case of P picture, IDCT section 14 carries out IDCT to calculate a differential value of each block. An adder 15 adds the differential value and a motion compensated block obtained by motion compensating, by forward prediction section 18, a video code of preceding frame stored in a preceding frame section 16. Thus, an image is expanded and reproduced. By fixing the picture structure to I picture and P picture, it is possible to dispense with judgement whether or not the picture is B picture and backward prediction or bidirectional prediction in processing of the B picture.

3 Claims, 25 Drawing Sheets

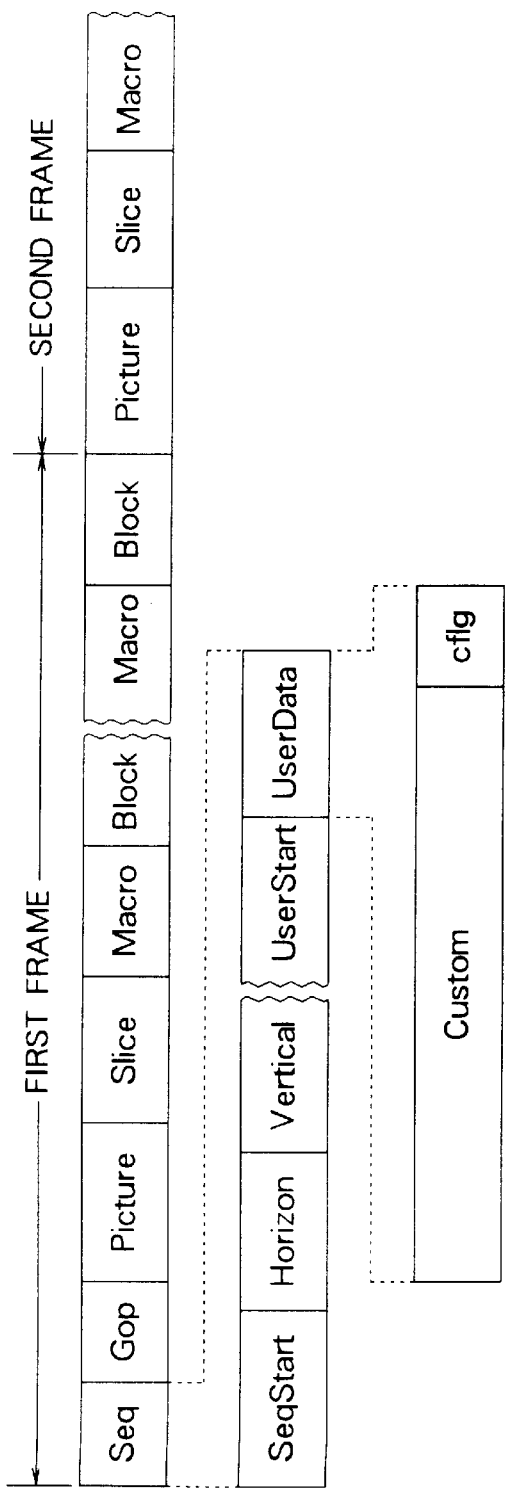

$q(i,j) = d(i,j) + p'(i,j)$ $i = 0 \sim 8, \quad j = 0 \sim 8$

MOTION COMPENSATION : $(dx, dy)$ $q(i,j) = d(i,j) + p(i,j)$ $i = 0 \sim 8, \quad j = 0 \sim 8$

| CODE | I1 | P2 | P3 | P4 | P5 | P6 |
|---|---|---|---|---|---|---|
| DISPLAY | I1 | P2 | P3 | P4 | P5 | P6 |
| TOTAL DIFFERENTIAL VALUE | 28 | 21 | 15 | 43 | 25 | |

| CODE | I1 | P2 | P3 | P4 | P5 | P6 |
|---|---|---|---|---|---|---|
| DISPLAY | I1 | I1 | I1 | P4 | P4 | P6 |
| TOTAL DIFFERENTIAL VALUE | 28 | 21 | 15 | 43 | 25 | |

: NON-RENEWAL OF DISPLAY

I : INTRAFRAME CODE
P : FORWARD PREDICTION CODE
B : BIDIRECTIONAL PREDICTION CODE

FIG. 22A

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 22B

| 1 | 2 | 6 | 7 | 15 | 16 | × | × |
|---|---|---|---|---|---|---|---|
| 3 | 5 | 8 | 14 | 17 | × | × | × |
| 4 | 9 | 13 | 18 | × | × | × | × |
| 10 | 12 | 19 | × | × | × | × | × |
| 11 | 20 | × | × | × | × | × | × |
| 21 | × | × | × | × | × | × | × |
| × | × | × | × | × | × | × | × |
| × | × | × | × | × | × | × | × |

CALCULATE ASSUMING THAT THE PORTIONS X ARE EQUAL TO ZERO

FIG. 25

| ← ESC → | ← RUN → | ← LEVEL → |
|---|---|---|
| 19 18 17 16 15 14 | 13 12 11 10 9 8 | 7 6 5 4 3 2 1 0 |
| 0 0 0 0 0 1 | x x x x x x | x x x x x x x x |

(1) ESC   : CODE INDICATIVE OF BEING ESCAPE CODE
(2) RUN   : RUN LENGTH (THE NUMBER OF INVALID COEFFICIENTS)
(3) LEVEL : LEVEL (THE NUMBER OF VALID COEFFICIENTS : -128 - +128)

FIG. 26

| RUN | LEVEL | ORDINARY CODE 2~17 BITS | ESCAPE CODE FIXED TO 20 BITS |
|---|---|---|---|
| 2 | 1 | 0 1010 | 0000 0100 0010 0000 0001 |
| 1 | 4 | 000 0001 1000 | 0000 0100 0100 0000 0100 |
| 2 | 5 | 00 0000 0010 1000 | 0000 0100 0101 0000 0101 |

COMPACT IMAGE TRANSMISSION SYSTEM AND IMAGE REPRODUCING DEVICE CAPABLE OF REPRODUCING A DCT-BASED CODE AT A HIGH SPEED WITHOUT DETERIORATION OF PICTURE QUALITY

This is a divisional of application Ser. No. 08/921,472, U.S. Pat. No. 5,847,767, filed Sep. 2, 1997 which is a Continuation application of 08/410,900 filed Mar. 27, 1995, now abandoned the disclosure of which is incorporated herein by reference.

BACKGROUND OF THE INVENTION

This invention relates to an image transmission system and an image reproducing device and, in particular, to a transmission system for transmitting a video code compressed and encoded by the use of discrete cosine transform (DCT) as orthogonal transform and an image reproducing device for reproducing such an encoded image, When a video signal is digitized and recorded in a recording medium such as a CD-ROM, a hard disk, and a magnetic tape, the video signal is generally compressed and encoded to be recorded because the amount of data is enormously large.

Proposals have been made of various compression encoding systems. Among those, use is frequently made of transform encoding by the use of orthogonal transform which efficiently utilizes correlation within a two-dimensional space of an image. Specifically, encoding systems based on the DCT as orthogonal transform are adopted in international standard encoding systems such as a color still image standard JPEG (Joint Photographic Expert Group) and a moving picture encoding standard for storage media (MPEG: Moving Pictures Expert Group).

In the MPEG, one sequence of a moving image is divided into groups of pictures (GOP), each group comprising a plurality of frames (pictures), to be subjected to encoding, as will later be described. The GOP comprises three types of pictures including an I picture which is an intraframe encoded image, a P picture which is an interframe encoded image predicted from a time sequentially preceding frame already encoded, and a B picture which is an interframe encoded picture predicted from time sequentially preceding and succeeding two frames.

A video code according to the MPEG can be reproduced by any reproducing unit based on the IPEG which is an international standard. However, processing carried out in the decoding unit and the IDCT unit imposes a heavy load upon a central processing unit (CPU). Therefore, high-speed reproduction can not be carried out unless the CPU operable at a high speed is used.

For example, when a JPEG- or MPEG-based video code reproducing device processes 15 frames per second, reproduction of a single frame must be carried out in about 66 milliseconds. It is assumed here that decoding of the Huffman code requires 30 ms, dequantization requires 10 ms, IDCT by the IDCT unit requires 20 ms, and display requires 20 ms. In this event, a total processing time of 80 ms is required. As a result, a delay of 14 ms is produced upon reproduction of an image of a single frame.

In order to reduce the load imposed upon the CPU, various proposals have been made in which the encoding system is partially modified so that high-speed reproduction can be carried out even with a low-speed CPU. For example, such proposals have been made in Japanese Patent Publications JP-A 241270/1990, JP-A 971/1992, JP-A 256452/1991, JP-A 357788/1992, and JP-A 299688/1992.

However, each of the conventional image reproducing devices and encoding systems mentioned in the above-referenced publications carries out image compression by partially modifying the encoding system and is not compatible with the international standard encoding systems. Therefore, a specific reproducing unit is required.

In the conventional image compression by reducing the amount of the compressed video codes, it is necessary to judge an optimum compression method for every block. Accordingly, preparation of the compressed codes requires a long time. In addition, the amount of the codes does not correspond to the processing ability of the image reproducing device. Accordingly, realtime reproduction is impossible by a reproducing device having a low processing speed. On the other hand, even with a high-speed reproducing device, no other than those codes having a predetermined picture quality can be reproduced because the amount of the compressed codes is determined.

SUMMARY OF THE INVENTION,

It is therefore an object of this invention to provide an image transmission system and an image reproducing device which have a simple structure but are capable of reproducing a DCT-based code at a high speed with deterioration of a picture quality suppressed as small as possible in correspondence to an ability of the reproducing device.

Other objects will become clear as the description proceeds.

According to an aspect of this invention, there is provided an image transmission system comprising:

preparing means for preparing an intraframe encoded image by segmenting an image into a plurality of blocks and by compressing and encoding each block by the use of discrete cosine transform;

preparing means for preparing an interframe encoded image by searching for a particular block at which a difference is smallest between a current frame and either a preceding frame or both preceding and succeeding frames in a time sequential order, by carrying out motion compensation on said each block, and by compressing and encoding a differential value between each block of said current frame and a motion compensated block by the use of discrete cosine transform;

multiplexing and transmitting means for multiplexing and transmitting said intraframe encoded image and said interframe encoded image together with a header;

transmitting means for transmitting an identifier for identifying at least one of fixed parameters including a type of said interframe encoded image to be transmitted with said intraframe encoded image and a motion compensation value fixed as said fixed parameters with are transmitted to a reproducing side together with said header; and expansion processing means for carrying out expansion processing after detecting said identifier in said header to thereby identify said fixed parameter of an input video code.

According to another aspect of this invention, there is provided an image reproducing device comprising:

expanding and reproducing means for expanding and reproducing a video code comprising an intraframe encoded image and an interframe encoded image which are multiplexed together with a header having a fixed parameter identifier, said intraframe encoded image being prepared br segmenting an image into a plurality of blocks and by compressing and encoding each block by the use of discrete cosine transform, said interframe encoded image being prepared by searching for a particular block at which a difference is smallest between a current frame and a preceding frame in a time sequential order, by carrying out motion compensation on said each block, and by compressing and encoding a differential value between each block of said current frame and a motion compensated block by the use of discrete cosine transform;

header analyzing means for judging, with reference to said header contained in said video code supplied as an input video code, whether or not said input video code exclusively comprises said intraframe encoded image and said interframe encoded image with a type of said interframe encoded image fixed; and expansion processing means for detecting whether or not said input video code is said intraframe encoded image when said header analyzing means judges that said input video code in such a code that the type of said interframe encoded image is fixed, for carrying out expansion processing of said intraframe encoded image when it is detected that said input video code to said intraframe encoded image, and for carrying out expansion proceeding of said interframe encoded image when it is detected that said input video code is not said intraframe encoded image.

According to still another aspect of this invention, there is provided an image reproducing device comprising;

reproducing means for reproducing a moving image compressed and encoded by the use of a high-efficiency encoded intraframe code and a high-efficiency encoded interframe code, said intraframe code being prepared by segmenting said image into small blocks, by carrying out discrete cosine transform on each block, and by quantizing a result of said transform, said interframe code being prepared by segmenting said image into small blocks, by searching for a particular block at which a difference is smallest between a current frame and preceding and succeeding frames, by carrying out motion compensation on each block, by calculating a difference between each block of the current frame and each block of a motion compensated frame, by carrying out discrete cosine transform on a differential block, and by quantizing a result of said transform; and judging means for judging whether or not a code has a fixed parameter by analyzing said code.

BRIEF DESCRIPTION OF THE DRAWING

FIG. 4 is a view for illustrating a structure of an MPEG-based code format in relation to the first embodiment of this inventions

FIG. 19(C) is a flow chart illustrating a judgement whether the processing of FIG. 19(A) or FIG. 19(B) is to be processed;

FIG. 21(C) is a flow chart illustrating a judgement whether the processing of FIG. 21(A) or FIG. 21(B) is to be processed;

FIG. 22(A) is a view for describing processing in the assumption that high frequency components are not equal to zero;

FIG. 22(B) is a view for describing processing in the assumption that high frequency components are equal to zero;

FIG. 25 is a view showing a format of an escape code;

FIG. 26 is a table illustrating examples of an ordinary code and the escape code;

DESCRIPTION OF THE PREFERRED EMBODIMENTS

Figure 1:
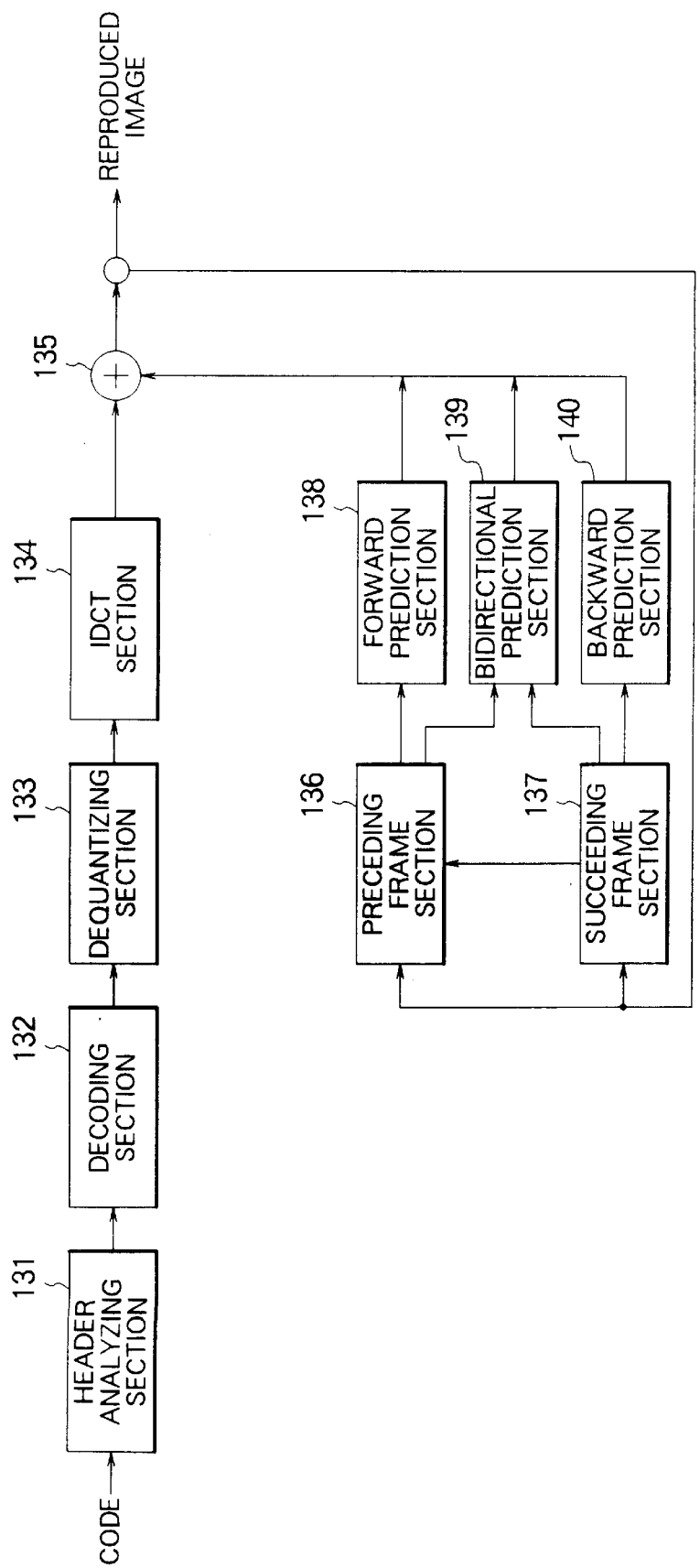
FIG. 1 is a block diagram of one example of a conventional image reproducing device.

Referring to FIG. 1, description is, at first, made about a conventional image reproducing device for a better understanding of this invention.

Reproduction of a video code according to a conventional DCT-based encoding system will be described in conjunction with the MPEG by way of example, FIG. 1 is a block diagram of one example of the conventional image reproducing device. The conventional image reproducing device reads a video code according to the MPEG and analyzes a code type and the like by the use of header analyzing section 131.

When the header analyzing section 131 analyzes that an input video code is the I picture, a high-efficiency compressed variable-length Huffman code of the I picture is decoded by decoding section 132, dequantized by dequantizing section 133, and subjected to inverse DCT (IDCT) by IDCT section 134 to calculate a value of an image of each block. The image as expanded is outputted through an adder 135 and supplied to a preceding frame section 136 or a succeeding frame section 137 to be stored therein.

When the header analyzing section 131 analyzes that the input video code in the P picture, the P picture is decoded by the decoding section 132, dequantized by the dequantizing section 133, and subjected to IDCT by the IDCT section 134 to calculate a differential value of each block. The differential value is supplied to the adder 135 and added to a motion compensated block obtained by motion-compensating, by forward prediction section 138, a video code of a preceding frame stored in the preceding frame section 136. Thus, the video code is expanded into an original image which is outputted and which it supplied to the preceding frame section 136 or the succeeding frame section 137 to be stored therein.

When the header analyzing section 131 analyzes that the input video code is the B picture, the B picture is decoded by the decoding section 132, dequantized by the dequantizing section 133, and subjected to IDCT by the IDCT section 134 to calculate a differential value of each block. The differential value is supplied to the adder 135 and added to a motion compensated block obtained by motion-compensating, by bidirectional prediction section 139, a video code of a preceding/succeeding frame stored in the preceding frame section 136 or the succeeding frame section 137 and to a motion compensated block obtained by motion-compensating, by backward prediction section 140, a video code of a succeeding frame stored in the succeeding frame section 137. Thus, the video code is expanded into an original image which is outputted and which is supplied to the preceding frame section 136 or the succeeding frame section 137 to be stored therein.

Thus, a video code according to the MPEG can be reproduced by any reproducing device based on the MPEG which is an international standard. However, processing carried out in the decoding section 132 and the IDCT section 134 imposes a heavy load upon a central processing unit (CPU). Therefore, high-speed reproduction can not be carried out unless the CPU operable at a high speed is used.

As mentioned before in the preamble of the instant specification, when a JPEG- or MPEG-based video code reproducing device processes 15 frames per second, reproduction of a single frame must be carried out in about 66 milliseconds. It is assumed here that decoding of the Huffman code requires 30 ms, dequantization requires 10 ms, IDCT by the IDCT section 134 requires 20 ms, and display requires 20 ms. in this event, a total processing time of 80 ms is required. As a result, a delay of 14 ms is produced upon reproduction of an image of a single frame.

Figure 2:
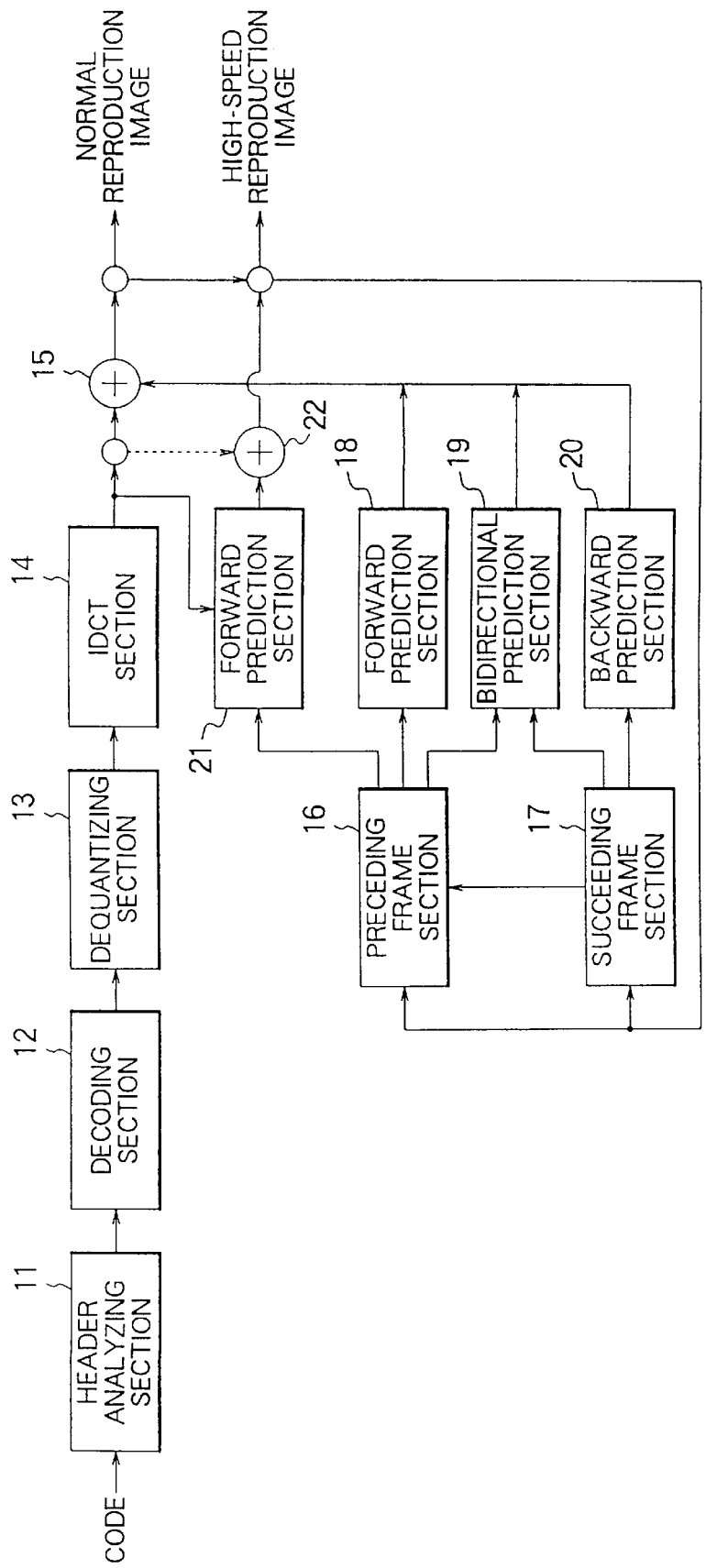
FIG. 2 is a block diagram of an image reproducing device according to a first embodiment of this invention.

Now, description will proceed to a first embodiment of this invention, FIG. 2 is a block diagram of an image reproducing device according to the first embodiment of this invention.

As illustrated in FIG. 2, the image reproducing device of this embodiment comprises header analyzing section 11 for analyzing an input video code, decoding section 12 for decoding the input video code, dequantizing section 13 for dequantizing decoded video data, IDCT section 14 for carrying out IDCT upon dequantized video data, an adder 15, a preceding frame section 16 for storing video data at a frame time-sequentially one frame earlier with respect to an output of the adder 15, a succeeding frame section 17 for storing video data at a frame time-sequentially one frame later with respect to the output of the adder 15, forward prediction section 28 for carrying out prediction with reference to an output of the preceding frame section 16, bidirectional prediction section 19 for carrying out prediction with reference to outputs of both the preceding frame section 16 or the succeeding frame section 17, backward prediction section 20 for carrying out prediction with reference to the output of the succeeding frame section 17, forward prediction section 21, and an adder 22.

Figure 3A:
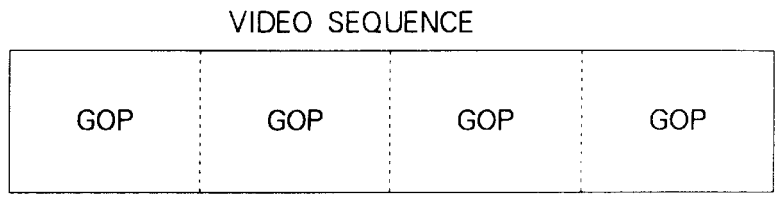
FIG. 3(A) shows a video sequence of a moving image in a hierarchical structure of an MPEG code format.
Figure 3B:
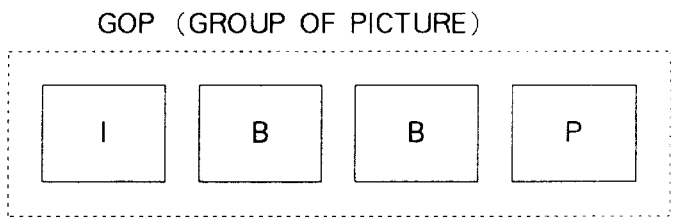
FIG. 3(B) shows a group of picture of the moving image in the hierarchical structure of the MPEG code format.
Figure 3C:
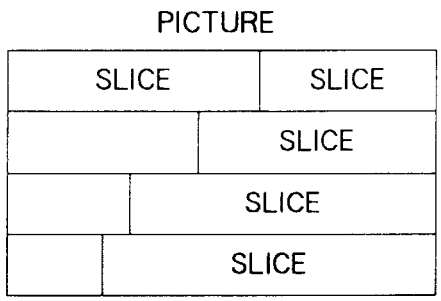
FIG. 3(C) shows a picture of the moving image in the hierarchical structure of the MPEG code format.
Figure 3D:
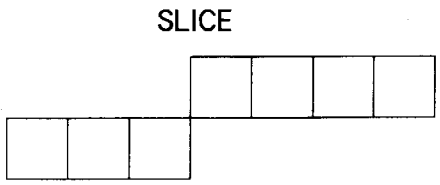
FIG. 3(D) shows a slice of the moving image in the hierarchical structure of the MPEG code format.
Figure 3E:
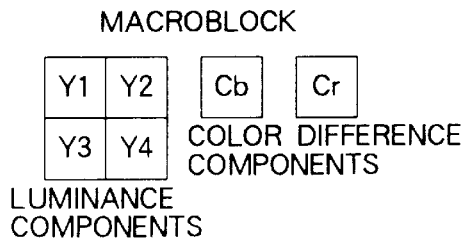
FIG. 3(E) shows a macroblock of the moving image in the hierarchical structure of the MPEG code format.
Figure 3F:
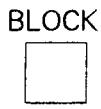
FIG. 3(F) shows a block of the moving image in the hierarchical structure of the MPEG code format.

The reproducing device illustrated in FIG. 2 carries out reproduction of an input video code according to the MPEG. Description will at first be made of a hierarchical structure of a code format of the MPEG in conjunction with FIG. 3. In the MPEG, a topmost layer is a sequence (video sequence) of a moving image. The sequence comprises a plurality of groups of pictures (GOP) as illustrated in FIG. 3(A). A single GOP comprises a plurality of frames (pictures) as illustrated in FIG. 3(B). The GOP comprises three kinds of pictures including an I picture which is an intraframe encoded image, a P picture which is an interframe encoded image predicted from a time sequentially preceding frame already encoded, and a B picture which is an interframe encoded image predicted from time sequentially preceding and succeeding two frames. As illustrated in FIG. 3(C), each picture comprises a plurality of slices formed by segmenting the picture into desired areas. As illustrated in FIG. 3(D), each slice comprises a plurality of macroblocks arranged from left to right or from top to bottom. As illustrated in FIG. 3(E), a single macroblock comprises six blocks in total, including four adjacent luminance component blocks Y1 to Y4, and a single color difference component block Cb and a single color difference component block Cr in an area positionally corresponding thereto. As illustrated in FIG. 3(F), each block comprises 8×8 pixels. This block is a minimum unit in encoding and a processing unit in DCT. On the other hand, a minimum unit in motion prediction compensation is a macroblock.

Next referring to FIG. 4, description will be made as regards the format of the input video code according to the MPEG. The input video code comprises, in each layer, a sequence header Seq, a GOP header Gop assigned to each GOP, a picture header Picture for identifying each picture, a slice header Slice for identifying each slice, a macro header Macro for identifying each macroblock, and a block code Blocks.

As illustrated in FIG. 4, the sequence header Seq located at the leading edge of the input video code, namely, only at the leading edge of a first frame comprises a sequence header start code SeqStart, a transversal pixel number code Horizon indicative of the number of pixels (horizontal size) after transversal expansion, a longitudinal pixel number code Vertical indicative of the number of pixels (vertical size) after longitudinal expansion, a user data presence code UsrStart indicative of presence of user data, and a user data area UserData.

In the MPEG, the sequence header Seq contains the user data ares UserData which can be freely defined by a user. This embodiment is characterized by arranging in that area an Identifier "Custom" of, for example, six bytes indicative of being a code compressed by the use of the fixed parameter, and a fixed parameter flag "cflag" of, for example, two bytes, as illustrated in FIG. 4.

The above-mentioned fixed parameter flag cflag indicates that the video code is restricted to the I picture and the P picture, when the least significant bit (B0) of the two bytes has a level "1". When the second bit (B1) counted from the least significant bit of the two bytes has a level "1", it is indicated that the video code is a code with the motion compensation value fixed.

Turning back to FIG. 2, description will be continued. This embodiment has a structure capable of carrying out high-speed reproduction and normal reproduction. In the normal reproduction, the device of this embodiment carries out expansion and reproduction of three types of encoded Images (video code) including the I picture which is an intraframe encoded image, the P picture which is an interframe encoded image predicted from a time-sequentially preceding frame already encoded, and the B picture which is an interframe encoded image predicted from time-sequentially preceding and succeeding two frames.

After judging the picture type of the input video code, the header analyzing section 11 produces a control signal for controlling an addition at the adder 15, although not shown in FIG. 2, to selectively control the addition of output differential values of the forward prediction section 18, the bidirectional prediction section 19, and the backward prediction section 20 to an output of the IDCT section 14. Such selective control of the addition at the adder 15 may be carried out by the use of a control signal separately produced from the IDCT section 14.

When the input video code is the 7 picture, the I picture is decoded by the decoding section 12, dequantized by the dequantizing section 13, subjected to inverses DCT (IDCT) by the IDCT section 14 to calculate the value of the image of each block. The video code is expanded into the image which is outputted through the adder 15 as it is and which is supplied to the preceding frame section 16 or the succeeding frame section 17 to be stored therein.

When the header analyzing section 11 analyzes that the input video code is the P picture, the P picture is decoded by the decoding section 12, dequantized by the dequantizing section 13, subjected to IDCT by the IDCT section 14 to calculate the differential value of each block. The differential value is supplied to the adder 15 to be added to a motion compensated block obtained by motion compensating, by the forward prediction section 18, the video code of the preceding frame stored in the preceding frame section 16. Thus, the video code is expanded into the original image which is outputted and which is supplied to the preceding frame section 16 or the succeeding frame section 17 to be stored therein. When the header analyzing section 11 analyzes that the input video code is the B picture, the B pictures is decoded by the decoding section 12, dequantized by the dequantizing section 13, subjected to IDCT by the IDCT section 14 to calculate the differential value of each block. The differential value is supplied to the adder 15 to be added either to a motion compensated block obtained by motion compensating, by the bidirectional prediction section 19, the video code of the preceding/succeeding frame stored in the preceding frame section 16 or the succeeding frame section 17 or to a motion compensated block obtained by motion compensating, by the forward prediction section 18, the video code of the preceding frame stored in the preceding frame section 16 and a notion compensation block obtained by motion compensating, by the backward prediction section 20, the video code of the succeeding frame stored in the succeeding frame section 17. Thus, the video code is expanded into the original image which is outputted and which is supplied to the preceding frame section 16 or the succeeding frame section 17 to be stored therein.

The above-mentioned operation in normal reproduction is similar to the prior art. This invention has a characteristic different from the prior art in an operation of high-speed reproduction which will presently be described. As regards high-speed reproduction, the header analyzing section 11 for reading the input video code to carry out header analysis detects whether or not the user data UserData in the sequence header Seq contain the identifier Custom. In presence of the identifier Custom, high-speed reproduction is carried out.

In case of high-speed reproduction, processing is carried out assuming that the picture structure is fixed to the I picture and the P picture and that the motion compensation value is fixed. The I picture is decoded by the decoding section 12, dequantized by the dequantizing section 13, and subjected to IDCT by the IDCT section 14 to calculate the value of the pixels in each block. Thus, the video code is expanded into the image.

The P picture is decoded by the decoding section 12, dequantized by the dequantizing section 13, and subjected to IDCT by the IDCT section 14 to calculate the differential value of each block. The differential value is added by the adder 15 to the motion compensated block obtained by motion compensating, by the forward prediction section 18, the video code of the preceding frame stored in the preceding frame section 16. Thus, the video code is expanded and reproduced into the image.

Next, description will be made further in detail as regards the operation of the above-mentioned high-speed reproduction. At first, processing in case where the picture structure is fixed will be described. As described in the foregoing, the MPEG prescribes three types of pictures, namely, the I picture, the P picture, and the B picture. Upon reproduction of the input video code, it is unnecessary, for the I pictures to refer to the image of the preceding or the succeeding frame because it is an intraframe encoded image. On the other hand, the P picture requires forward prediction with reference to the image of the preceding picture. The B picture requires backward prediction or bidirectional prediction with reference to the image of the preceding frame or the image of the succeeding frame. Accordingly, the B picture code requires a long processing time as compared with the I picture code or the P picture code.

Figure 5B:
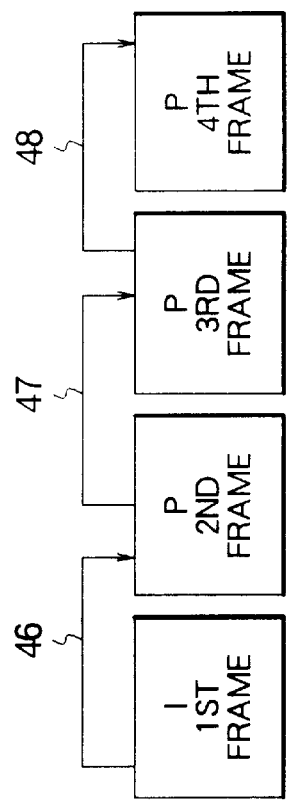
FIG. 5(B) is a view for describing a processing in the image reproducing device in case where a picture structure is fixed, assuming that the input video code comprises the I picture in the first frame and the P pictures in the second through the fourth frames.
Figure 5A:
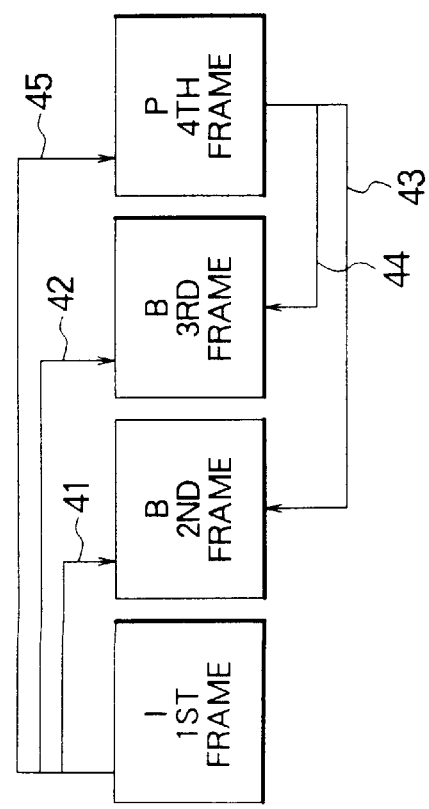
FIG. 5(A) is a view for describing a processing in the image reproducing device in case where a picture structure is not fixed, assuming that the input video code comprises the I picture, the B picture; the B picture, and the P picture in this order from the first to the fourth frames.

It is assumed that the input video code comprises the I picture, the B picture, the B picture, and the P picture in this order from the first frame to the fourth frame as illustrated in FIG. 5(A). In this event, the first frame requires no reference frame because it is the I picture. For the second and the third frame each of which is the B picture, backward prediction or the bidirectional prediction is carried out with reference to the image of the I picture in the first frame as a preceding frame and to the image of the P picture in the fourth frame as a succeeding frame, as schematically depicted at 41 to 44. As regards the fourth frame which is the P picture, forward prediction is carried out with reference to the image of the I picture in the first frame as a preceding frame. This case requires a long time to process the A picture and is not adapted to high-speed reproduction.

On the other hand, it is assumed that the input video code is fixed to the I picture and the P picture alone and comprises, for example, the I picture in the first frame and the P pictures in the second through the fourth frames, as illustrated in FIG. 5(B) in this case, no reference frame is required for the first frame because it is the I picture. For the second through the fourth frames each of which is the P picture, forward prediction alone is carried out with reference to the image of I picture or the P picture of one frame before, as schematically depicted at 46, 47, and 48 in FIG. 5(B). This case dispenses with processing of the B picture and is adapted to high-speed reproduction.

Figure 6A:
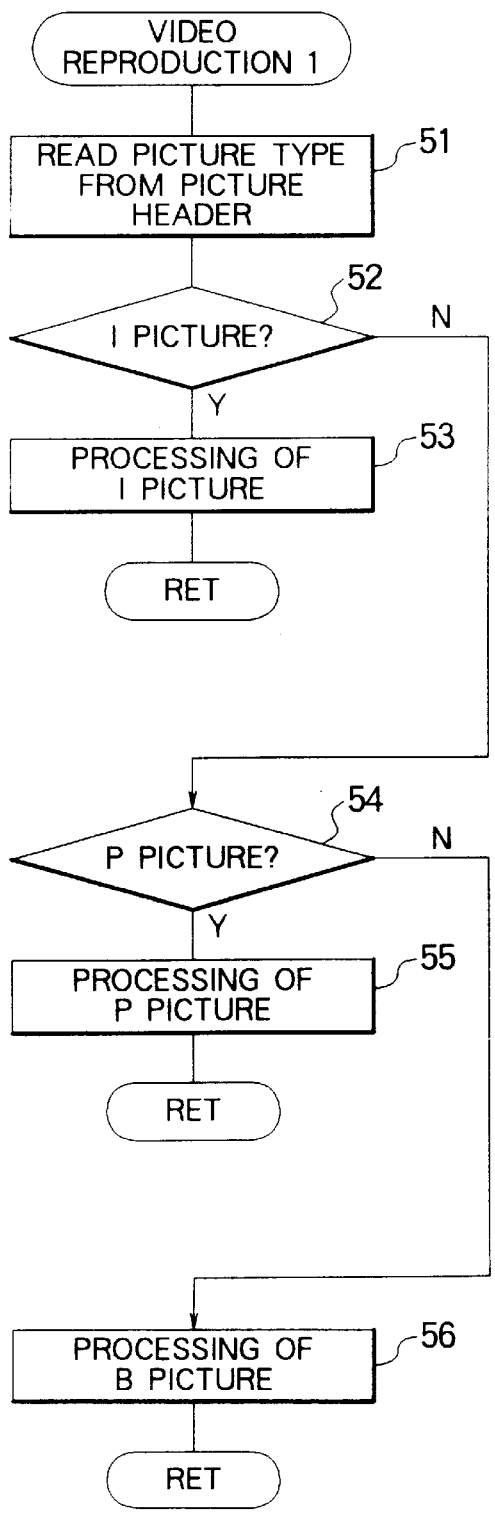
FIG. 6(A) is a flow chart for describing an operation of the image reproducing device illustrated in FIG. 2, which is based on a picture structure in accordance with the input video code illustrated in FIG. 5(A)

In conjunction with flow charts illustrated in FIGS. 6(A) and (B), description will proceed to a reproducing operation carried out by the embodiment of FIG. 2 when the video code having the structure illustrated in each of FIGS. 5(A) and (B) is supplied. At first, when the video code having the picture structure illustrated in FIG. 5(A) is supplied, the operation is carried out in accordance with the flow chart illustrated in FIG. 6(A).

The header analyzing section 11 in FIG. 2 reads the type of the picture from the picture header "Picture" in FIG. 4) in the input video code (step 51) and judges whether or not it is the I picture (step 52). In case of the I picture, the above-mentioned processing of the I picture is carried out by the encoding section 12, the dequantizing section 13, and the IDCT section 14 illustrated in FIG. 2 to perform expansion and reproduction (step 53).

Judging in the step 52 that it is rot the I picture, the header analyzing section 11 then judges whether or not it is the P picture (step 54). In case of the P picture, the processing of the P picture is carried out (step 55). If it is not the P picture, the processing of the B picture is carried out judging that it is the B picture (step 56). The above-mentioned processing of the P picture is carried out by the encoding section 12, the dequantizing section 13, the IDCT section 14, the adder 15, the preceding frame section 16, the succeeding frame section 17, and the forward prediction section 18 illustrated in FIG. 2 in the manner described in the foregoing. The processing of the B picture is carried out by the use of the bidirectional prediction section 19 and the backward prediction section 20 in addition.

Figure 6B:
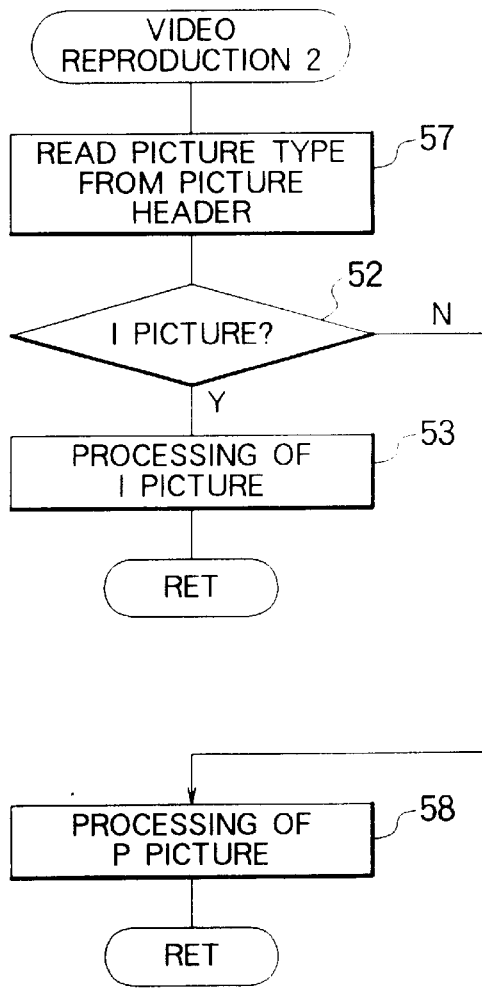
FIG. 6(B) is a flow chart for describing an operation of the image reproducing device illustrated in FIG. 2, which is based on a picture structure in accordance with the input video code illustrated in FIG. 5(B)

On the other hand, when the video code fixed to the I picture and the P picture alone as illustrated in FIG. 5(B) is supplied, the operation is carried out in accordance with the flow chart illustrated in FIG. 6(B). In the figure, similar processing steps are assigned with the same reference numerals as in FIG. 6(A). At first, the header analyzing section 11 illustrated in FIG. 2 detects presence of the fixed parameter identifier "Custom" from the sequence header ("Seq" in FIG. 4) in the input video code, reads the type of the picture from the picture header ("Picture" in FIG. 4), and judges whether of not it is the I picture (step 52). In case of the I picture, the above-mentioned processing of the I picture is carried out by the encoding section 12, the dequantizing section 13, and the IDCT section 14 illustrated in FIG. 2 to perform expansion and reproduction (step 53).

Judging in the step 52 that it is riot the I picture, the header analyzing section 11 then judges that the picture is the P picture because the input video code has the fixed parameter. Like the step 55, the processing of the P picture is carried out (step 58).

According to this embodiment, it is possible, by fixing the picture structure to the I picture and the P picture, to dispense with the judgement whether or not the picture is the a picture and to omit the backward prediction or the bidirectional prediction in the processing of the B picture. Thus, high-speed reproduction is performed. In this case, the encoding format itself is similar to that of the MPEG so that compatibility with the MPEG is assured.

The foregoing description is directed to the operation in case where the types of the pictures to be transmitted are fixed to the I picture and the P picture. It is noted here that the transmission interval of the I picture may be fixed and the P picture is transmitted within the transmission interval. The operation of this embodiment in such instance will be described with reference to a flow chart illustrated in FIG. 7.

The header analyzing section 11 adds "1" to a variable i having an initial value of zero upon detection of the sequence header (step 61). Subsequently, judgement is made whether or not the variable i is greater than a key frame rate (step 62). The key frame rate is the number of frames indicating a fixed transmission interval of a single picture.

When judgement is made in the step 62 that i is smaller than the key frame rate, the processing of the P picture is carried out (step 65). Specifically, the motion compensated block obtained by motion compensating, by the forward prediction section 18, the video code of the preceding frame stored in the preceding frame section 16 is added by the adder 15 to the differential value obtained by the above-mentioned decoding section 12, the dequantizing section 13, and the IDCT section 14 to thereby carry out expansion and reproduction of the image.

Herein, the P picture requires a reference to the image of the preceding picture. On the other hand, the I picture does not need any reference to the image of the preceding picture. In this connection, the first frame always comprises the I picture. The interval (key frame rate) of the I picture is fixed. By starting the flow chart in FIG. 7 upon input of every frame, the value of the variable i to be compared in the step 62 represents the number of frames from the I picture to the current frame.

Accordingly, when judgement is made in the step 62 that the value of the variable i is greater than the key frame rate, it is detected that the input video code at that time instant is the I picture. Therefore, the processing of the I picture is carried out by the decoding section 12, the dequantizing section 13, and the IDCT section 14 (step 63). After completion of the processing of the I picture, the above-mentioned variable is reset to zero to prepare for the next processing (step 64).

Figure 7:
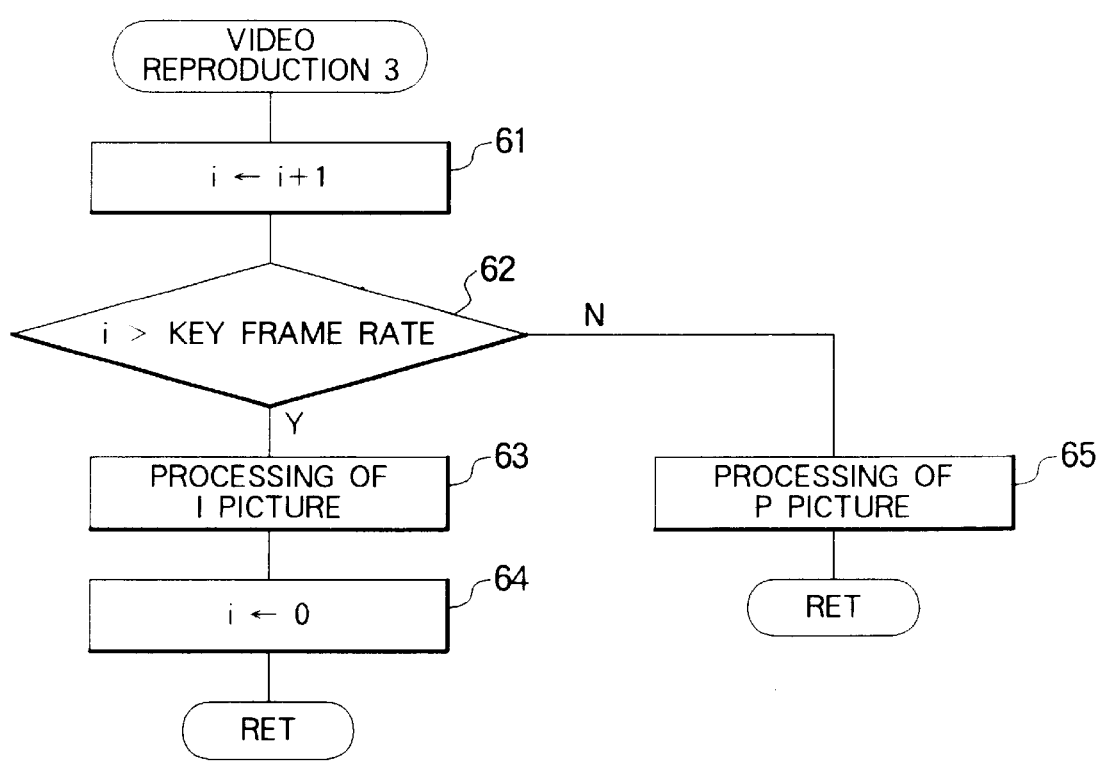
FIG. 7 is a flow chart for describing an operation of the image reproducing device illustrated in FIG. 2 in case where a picture interval is fixed.

As described, also in case of the processing in FIG. 7, it is possible to dispense with the judgement whether or not it is the B picture and to omit backward prediction or bidirectional prediction in processing of the B picture, like in FIG. 6(B) mentioned above. Thus, high-speed reproduction is carried out. In this case, the picture type is judged by the use of the variable i. Accordingly, the picture type can be judged without reading the picture header.

Next, description proceeds to the processing in case where the motion compensation is fixed. In the MPEG, motion compensation is contained in the P picture or the B picture code. A position of a reference block can be displaced. Specifically, in the MPEG, the image is segmented into small blocks. Each block is searched to find a particular block at which a difference is smallest between the current frame and the preceding frame of one frame before or preceding and succeeding two frames. Then, motion compensation is carried out. Calculation is made of a difference between each block in the current frame and the motion compensated block to obtain a differential block. The differential block is subjected to DCT and the result of transform is quantized to obtain the P picture or the B picture which is a high-efficiency encoded interframe code.

Figure 8A:
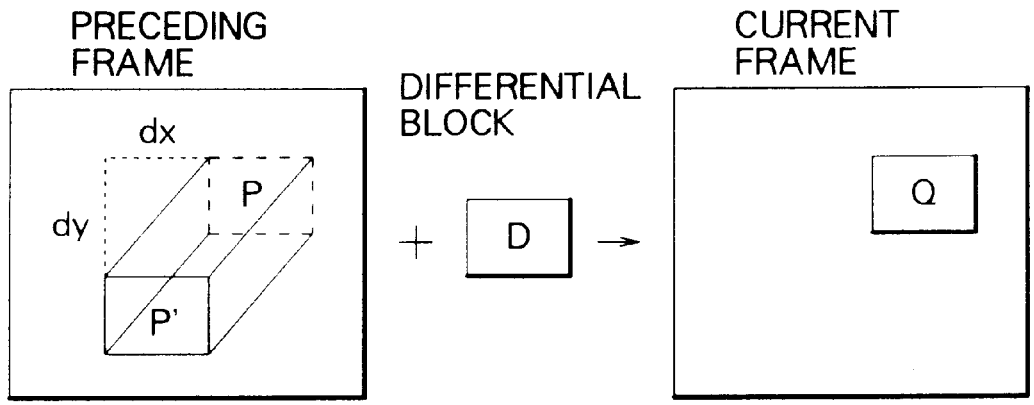
FIG. 8(A) is a view for describing a processing in case where motion compensation is not fixed.
Figure 8B:
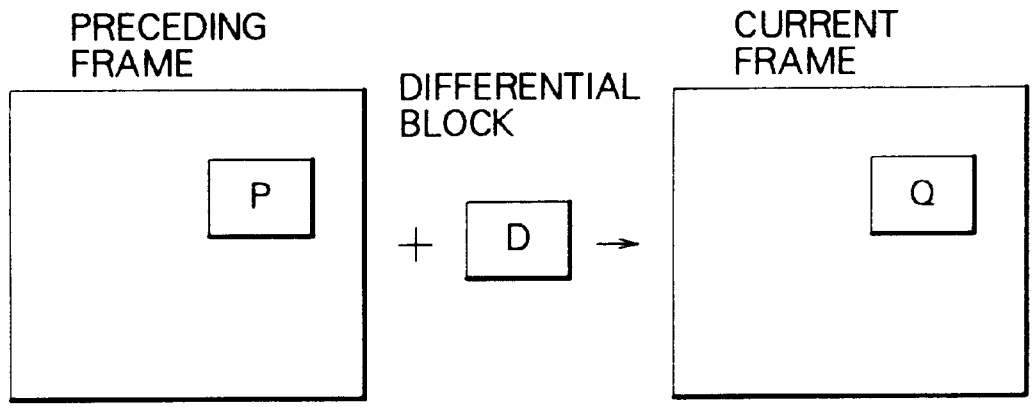
FIG. 8(B) is a view for describing a processing in case where motion compensation is fixed.

FIG. 8(A) shows a case where the motion compensation is not fixed. FIG. 8(B) shows a case where the motion compensation is fixed to (0, 0) (no motion compensation).

In the case illustrated in FIG. 6(A), a block P of the preceding frame is motion compensated by (dx, dy) into a motion compensated block P' which is referenced and added to a differential block D to be stored in a block Q of the current frame. On the other hand, FIG. 8(B) shows that the block P of the preceding frame is referenced and added to the differential block D to be stored in the block Q of the current frame.

Figure 9:
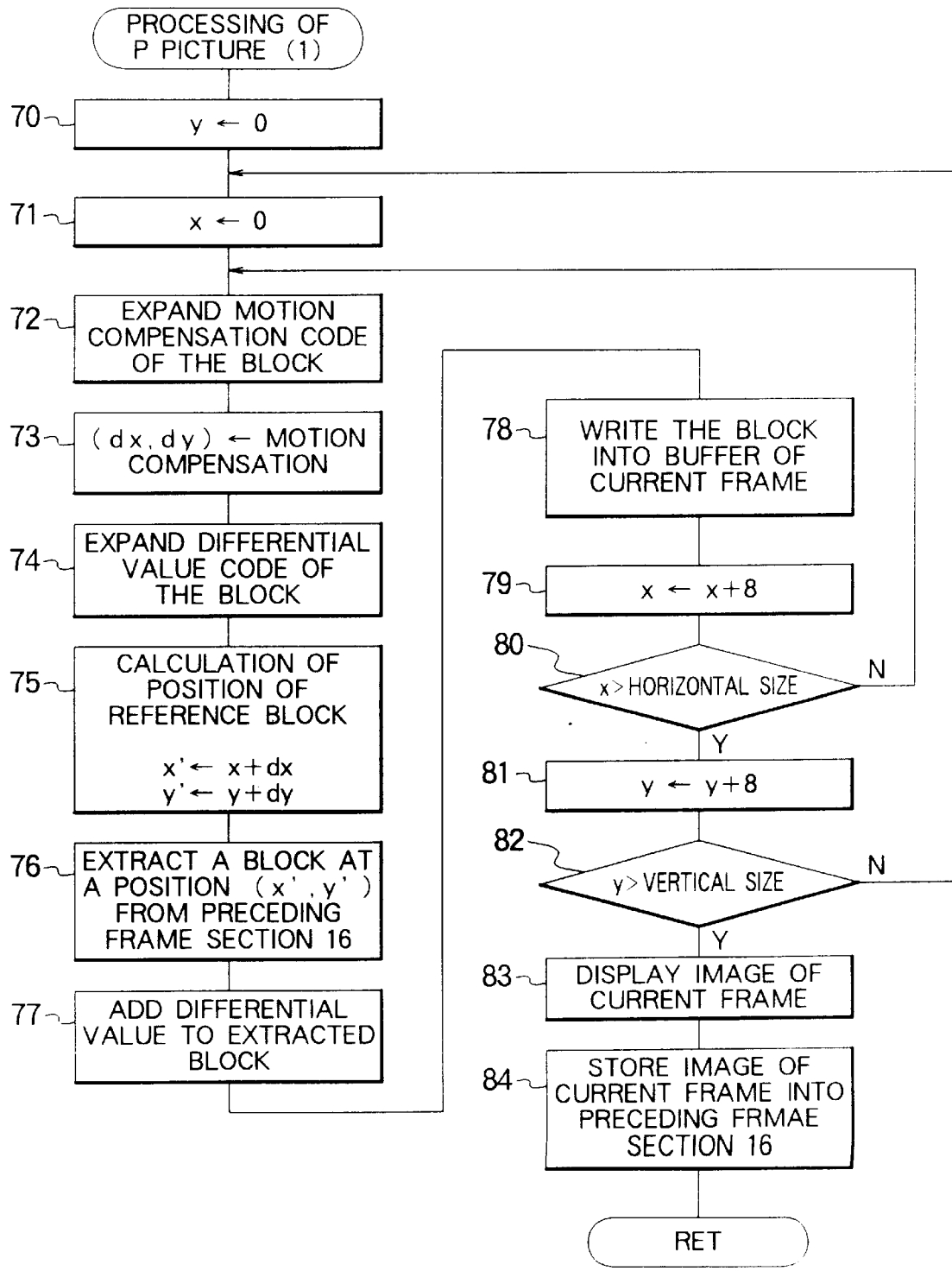
FIG. 9 is a flow chart for describing, an operation of FIG. 2 in case where motion compensation in contained.

In conjunction with a flow chart in FIG. 9, description will be made as regards an operation of the embodiment of FIG. 2 in case where the motion compensation illustrated in FIG. 8(A) is contained. In the processing of the P picture with motion compensation, each of variables y and x is at first set to an initial value of zero (steps 70, 71). Subsequently, a motion compensation code of the block is expanded by the forward prediction section 18 (step 72). The motion compensation value is stored in the variables dx and dy (step 73).

Next, a differential value code of the block is expanded by the forward prediction section 18 (step 74). The position of the reference block is calculated from the expanded motion compensation in accordance with the following formulas (step 75).

$$x'=x+dx \tag{1}$$

$$y'=y+dy \tag{2}$$

Next, the forward prediction section 18 extracts from the preceding frame section 16 a particular block at the position calculated in the above-mentioned step 75 (step 76). After the differential value is added to the particular block as extracted (step 77), the particular block is written in a buffer of the current frame (step 78). Subsequently, "8" is added to the variable x (step 79). Judgement is made whether or not the variable x after addition in greater than the horizontal size (Horizon in FIG. 4) analyzed from the sequence header Seq (step 80).

When x≦(horizontal size), the operation returns to the step 72. When x>(horizontal size), the operation proceeds to the step 81 to add "8" to the variable. Subsequently, judgement is made whether or not the variable y after addition is greater than the vertical size (Vertical in FIG. 4) analyzed from the sequence header Seq (step 82). When y≦(vertical size), the operation returns to the step 71.

When y>(vertical size), the video data of the current frame are delivered from the adder 15 to a display section, which is not illustrated in the figure, to be displayed (step 83). Then, the video data of the current frame delivered from the adder 15 are stored in the preceding frame section 16 (step 84).

Figure 10:
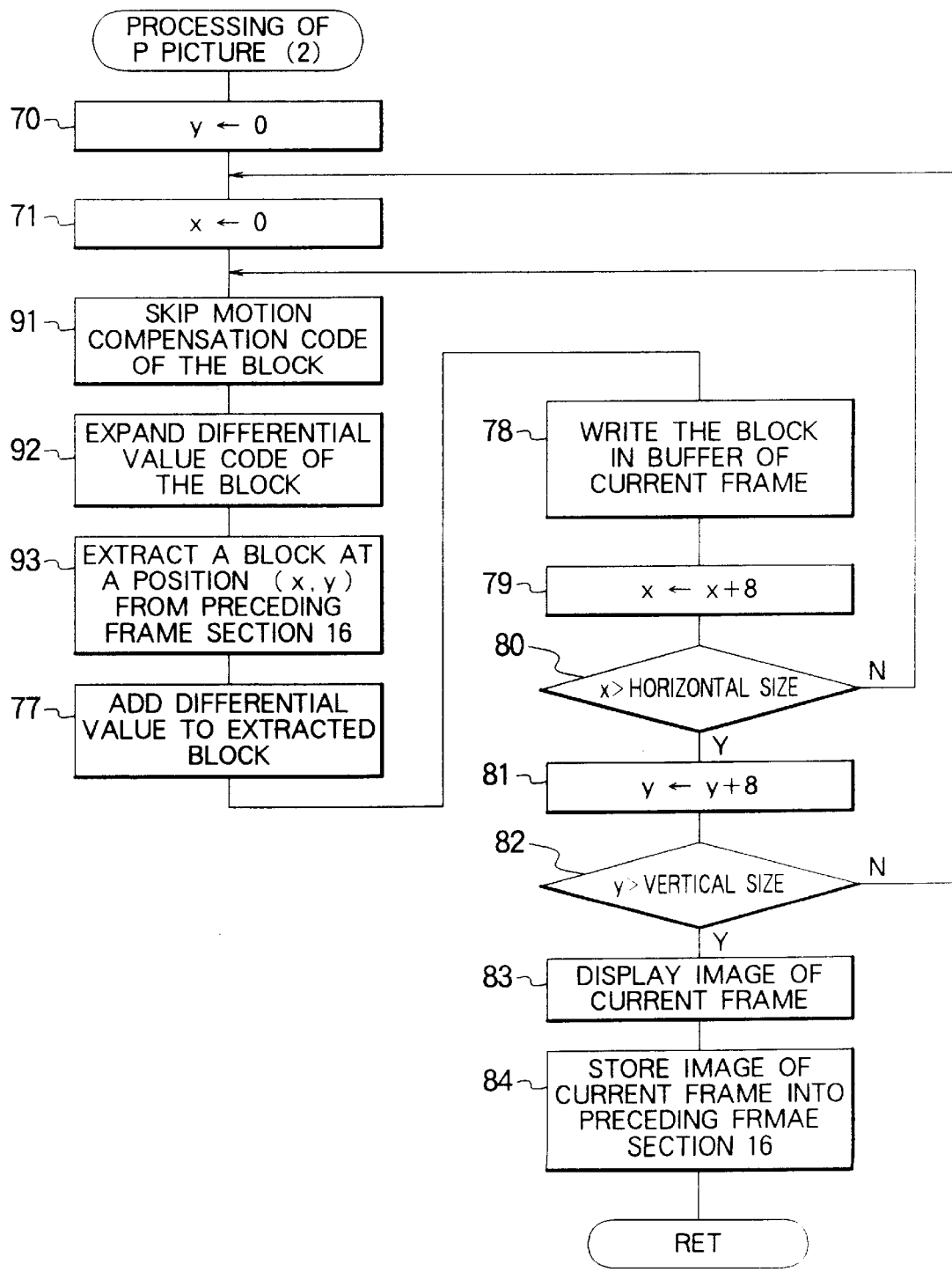
FIG. 10 is a flow chart for describing an operation of FIG. 2 in case where no motion compensation is contained.

Now, referring to a flow chart in FIG. 10, description will proceed to an operation of the embodiment in FIG. 2 in case where no motion compensation is contained as illustrated in FIG. 8(B). In the figure, the similar processing steps are designated by like reference numerals as in FIG. 9. When the header analyzing section 11 detects, with reference to the value of the above-mentioned flag cflg in the sequence header Seq, that no motion compensation is contained, the processing in the flow chart of FIG. 10 is executed.

In the processing of the P picture without motion compensation, each of the variables y and x is set to an initial value of zero (steps 70, 71). Subsequently, the motion compensation code of the block is skipped (step 91). The differential value code of the block is expanded by the forward prediction section 21 (step 92).

Next, the forward prediction section 21 extracts from the preceding frame section 16 a particular block at the position (x, y) represented by the variables x and y (step 93). The above-mentioned expanded differential value is added to the particular block as extracted (step 77). The block is written in the buffer of the current frame (step 78). Thereafter, like the processing in case where the motion compensation is contained, "8" is added to the variable x (step 79). Judgement is made whether or not the variable x after addition is greater than the horizontal size (step 80).

When x≦(horizontal size), the operation returns to the step 91. When x>(horizontal size), the operation proceeds to the step 81 to add "8" to the variable y. Subsequently, judgement is made whether or not the variable y after addition is greater than the vertical size (Step 82). When y≦(vertical size), the operation returns to the step 71.

When y>(vertical size), the video data of the current frame are delivered from the adder 15 to the display section, which is not illustrated in the figure, to be displayed (step 83). Thereafter, the video data of the current frame delivered from the adder 15 are stored in the preceding frame section 16 (step 84).

In FIGS. 8(B) and 10, the motion compensation has a value (0, 0). With the fixed value such as (2, 2), (−1, 0), and (0, 5), the positions of the reference blocks of the preceding frame are given by (x+2, y+2), (x−1, y), (x, y+5). Thus, each reference block is adjacent so that it is unnecessary to calculate the reference position for every block.

By fixing the motion compensation as described above, it is possible to omit expansion of the motion compensation code and calculation of the position of the reference block for every block. Thus, high-speed reproduction in carried out.

Next, processing of renewal/non-renewal of display will be described. In the MPEG, a code can be formed by the I picture which is an intraframe encoded image and the P picture which is an interframe encoded image. When the differential value is small, no significant change is visible even if the image of the P picture is not displayed. Accordingly, it is possible to increase the processing speed by saving the time for display of the image of the P picture in that period.

Judgement whether or not the differential value is small is carried out by comparison with a value (threshold value) determined by the processing speed of the reproducing device. In the reproducing device operable at a high speed, a small threshold value is selected to increase the number of times of renewal of the display. In the reproducing device having a low processing speed, a greater threshold value is selected to reduce the number of times of renewal of the display. Thus, the processing speed can be adjusted.

Figures 11A, 11B:
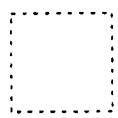
FIG. 11(A) is a view for describing a processing in case where the display of every P pictures is renewed.
FIG. 11(B) is a view for describing a processing In case where the display of the P picture is not renewed until a predetermined condition is satisfied.

FIG. 11(A) is a view for describing the processing in case where the display of every P pictures is renewed. FIG. 11(B) is a view for describing the processing in case where the display of the P picture is not renewed until a predetermined condition is satisfied, in FIG. 11(A) and (B), "CODE" represents the input video code supplied to the reproducing device. I and P represent the I picture and the P picture, respectively. Numerals indicate the orders of the frames. Furthermore, "DISPLAY" indicates the picture displayed by the display section. "TOTAL DIFFERENTIAL VALUE" below "DISPLAY" indicates a total sum of the differential values per one frame.

In the example illustrated in FIG. 11(A), the code as displayed coincides with the input video code. Every input video codes are displayed irrespective of the total differential values. On the other hand, dotted rectangles illustrated in the column of "DISPLAY" in FIG. 11(B) indicate that no renewal of display is carried out. Such non-renewal of display is achieved by continuously displaying the preceding frame until the cumulative value of the total differential value per one frame exceeds a predetermined threshold value (herein, "54").

In the example illustrated in FIG. 11(B), the second frame comprises the P picture and has the total differential value equal to "28" which is smaller than the threshold value "54". Accordingly, display of the P picture is not carried out but the I picture of one frame before is displayed. The third frame also comprises the P picture and the cumulative value of the total differential value is equal to "49" (=28+21). Accordingly, display of the P picture is not carried out but the I picture in the first frame is continuously displayed.

The fourth frame also comprises the P picture and has the total differential value equal to "15". The cumulative value of the total differential value is equal to "64" (=28+21+15) which is greater than the threshold value "54". Accordingly, the image of the P picture P4 in the fourth frame is displayed (display is renewed). By this renewal of display, the cumulative value of the total differential value is reset to zero.

The fifth frame also comprises the P picture. The total differential value and the cumulative value thereof are equal to "43" which is smaller than the threshold value "54". Accordingly, display of the P picture P5 in the fifth frame is not carried out but the P picture P4 of one frame before is displayed. As will be understood from the foregoing description, the P picture P6 in the sixth frame is displayed because the cumulative value of the total differential value exceeds the threshold value "54" (display is renewed).

In this embodiment, no renewal of display is carried out and the preceding frame is continuously displayed before the cumulative value of the total differential value of the P picture exceeds the threshold value. Accordingly, no renewal of displaying carried out at the second, the third, and the fifth frames. Thus, the number of processing times of display is reduced in correspondence to those three frames. As a consequence, high-speed processing is carried out.

Next referring to a flow chart in FIG. 12, description will be made as regards an operation of the embodiment of FIG. 2 in case where display of every P pictures is renewed as illustrated in FIG. 11(A). The header analyzing unit 11 in FIG. 12 reads the picture type from the picture header ("Picture" in FIG. 4) in the input video code (step 111) and judges whether or not it is the I picture (step 112).

In cave of the I picture, the processing of the I picture is carried out by the encoding section 12, the dequantizing section 13, and the IDCT section 14 illustrated in FIG. 2 to carry out expansion and reproduction (step 113). The video data expanded and reproduced are supplied through the adder 15 to the display section, which is not illustrated in the figure, to be displayed (step 114). The video data of the I picture after expansion are delivered from the adder 15 to the preceding frame section 16 to be stored therein (step 115).

On the other hand, judging in the step 112 that the picture is not the I picture, the header analyzing section 11 then judges that it is the P picture. The differential value is expanded by the above-mentioned decoding section 12, the dequantizing section 13, and the IDCT section 14 (step 116) and added by the adder 15 to the motion compensated block obtained by motion compensating, by the forward prediction section 18, the video code of the preceding frame stored in the preceding frame section 16 (step 117).

Thus, the image of the P picture is expanded and reproduced, and supplied to the display section to be displayed (step 118). The expanded video data extracted from the adder 15 are stored in the preceding frame section 16 (step 119).

Next referring to a flow chart in FIG. 13, description will be made as regards an operation of the embodiment of FIG. 2 in case where renewal of display of the P picture is not carried out until the predetermined condition in FIG. 11(B) in satisfied. In FIG. 13, the similar parts are designated by like reference numerals as in the processing steps of FIG. 12 and description thereof will be omitted.

Referring to FIG. 13, the header analyzing section 11 in FIG. 2 reads the picture type from the picture header ("Picture" in FIG. 4) in the input video code (step 111).

Figure 12:
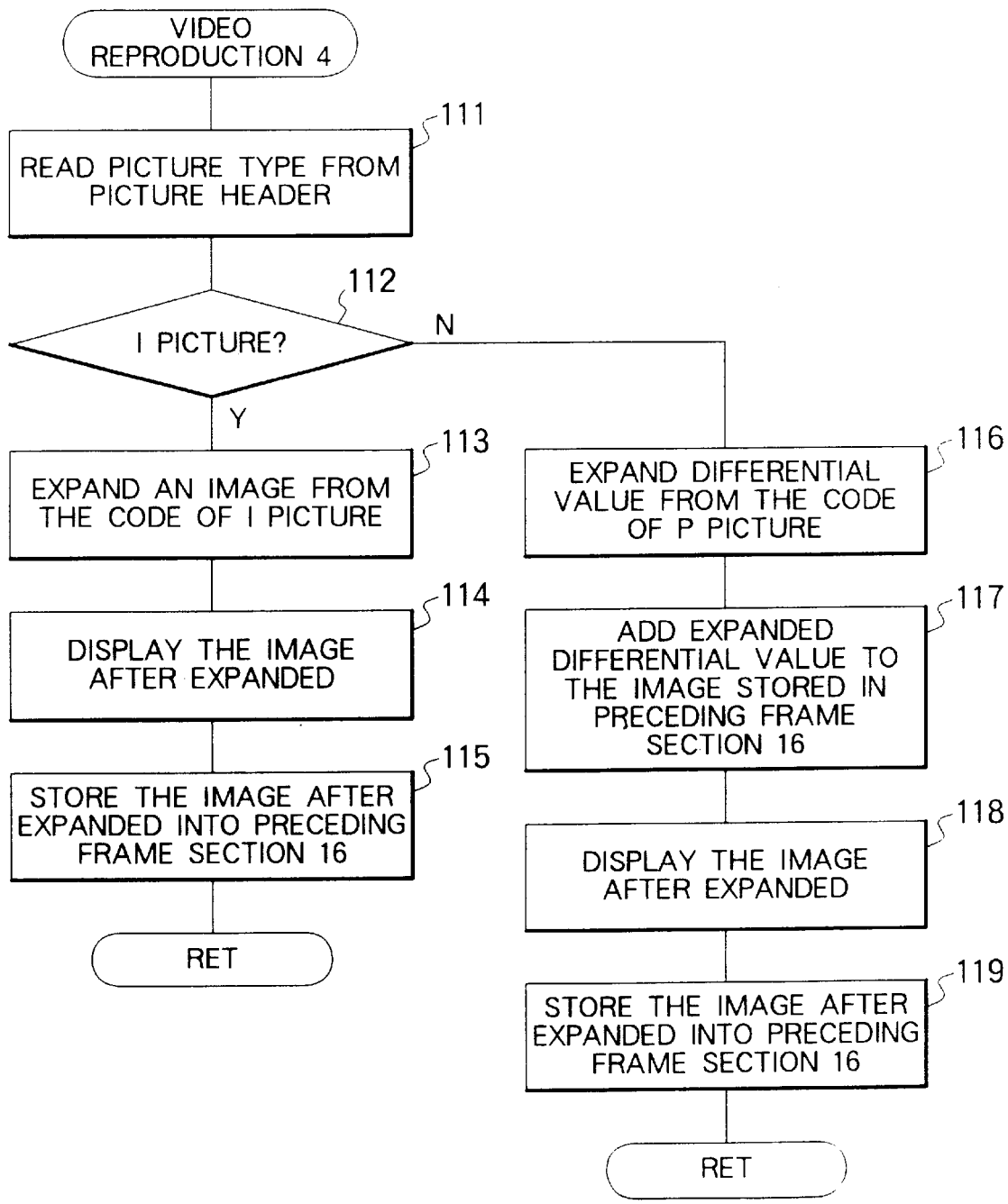
FIG. 12 is a flow chart for describing an operation upon renewal of display according to the embodiment of FIG. 2, as illustrated in FIG. 11(A)
Figure 13:
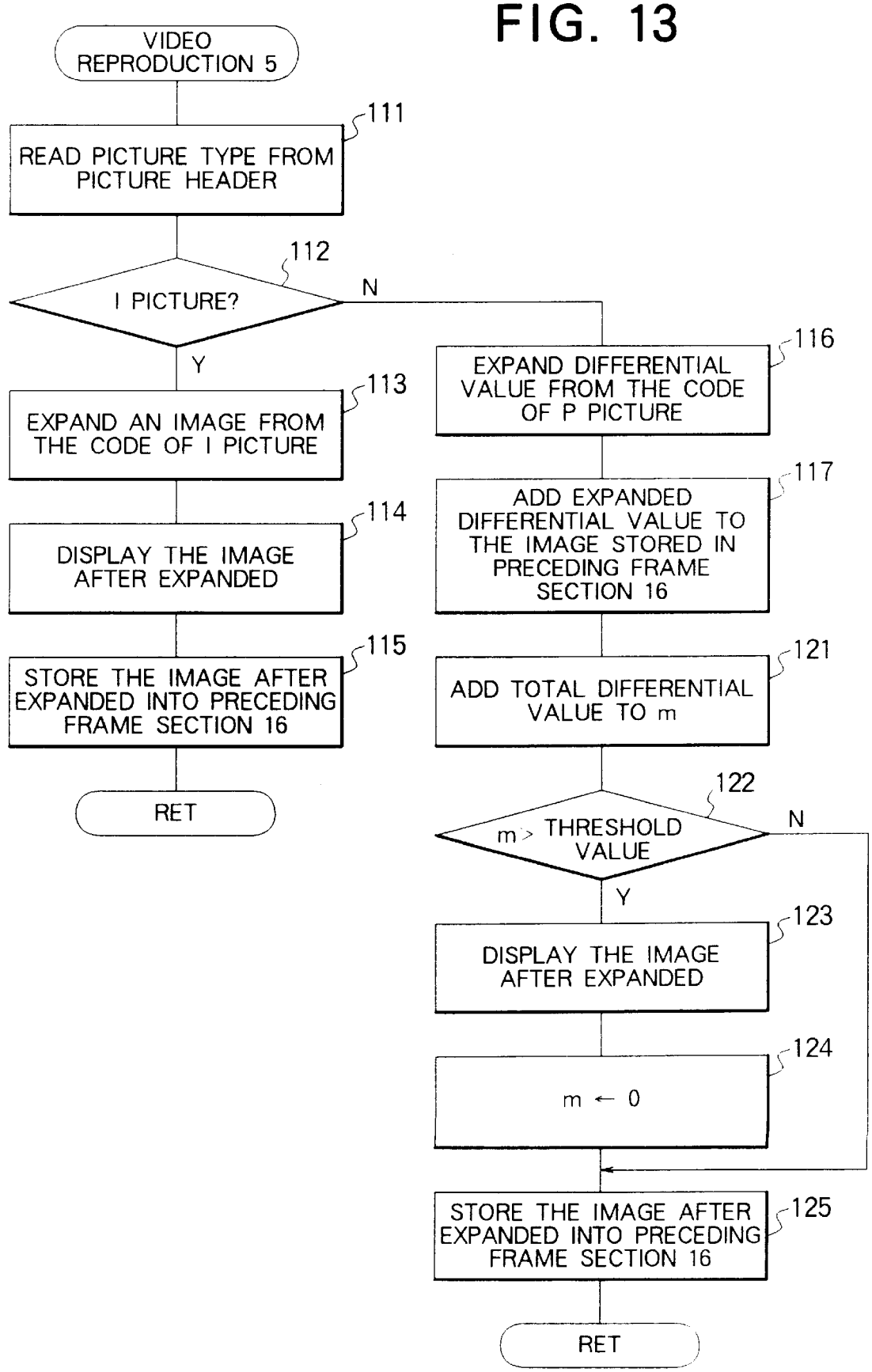
FIG. 13 is a flow chart for describing an operation upon non-renewal of display according to the embodiment of FIG. 2, as illustrated in FIG. 11(B)

When the picture is detected to be the I picture, operation is similar to FIG. 12 (steps 112–115). The renewal of display of the I picture is carried out at every time.

On the other hand, in FIG. 13, when judgement is made in the step 112 that the picture is not the I picture, the header analyzing section 11 then judges that it is the P picture. The image of the P picture is expanded and reproduced by the above-mentioned decoding section 12, the dequantizing section 13, the IDCT section 14, and the adder 15 (steps 116, 117).

Next, the forward prediction section 21 in FIG. 2 makes an internal adder add, to a variable m having an initial value of zero, the total differential value of the P picture supplied from the IDCT section 14 (step 121). Judgement is made whether or not the value of the variable m, namely, the cumulative value of the total differential value is greater than a predetermined threshold value (step 122).

When the variable m is not greater than the threshold value, the expanded image of the P picture produced from the adder 22 is supplied to the preceding frame section 16 (step 125). Accordingly, in this case, a display memory in the display section not illustrated in FIG. 2 is not rewritten by the output video data of the adder 22. The display section continuously displays the video data of the preceding frame stored in the display memory.

On the other hand, when the forward prediction section 21 in FIG. 2 judges in the step 122 that the variable m is greater than the threshold value, the motion compensated block obtained by motion compensating, by the forward prediction section 21, the video code of the preceding frame stored in the preceding frame section 16 in delivered to the adder 22. The motion compensated block is added to the expanded differential value from the IDCT section 14 to obtain the expanded video data of the P picture. The expanded video data are supplied to the display memory of the display section to renew the content of the display memory so that the video display is renewed (step 123).

Subsequently, the forward prediction section 21 resets the variable in to zero (step 124). Then, the expanded video data of the P picture extracted from the adder 22 are stored in the preceding frame section 15 (step 125). Thus, according to this embodiment, renewal of the display is not carried out until the cumulative value of the total differential value between frames exceeds the threshold value. Accordingly, it is possible to reduce the number of processing times for display of the image. As a consequence, high-speed processing can be carried out. Thus, this embodiment is adapted to high-speed reproduction.

In the foregoing description, the processing upon transmission of the I picture and the P picture alone with the interframe encoded image fixed to the P picture, the processing with motion compensation fixed, and display renewal/non-renewal processing may be carried out independently or in combination of two or all of them.

In the foregoing embodiment, description has been made in conjunction with the MPEG by way of example. However, this invention is not restricted thereto but is applicable to reproduction of the input video code encoded by other DCT-based encoding systems such as JPEG.

As described above, according to the image transmission system of this invention, expansion processing is carried out after identifying the fixed parameter contained in the input video code. Since the type of the interframe encoded image in the input video code can be specified, it is possible to dispense with the processing for the unsupplied unnecessary interframe encoded image or the motion compensation processing. As a result, the expansion processing can be carried out at a high speed so that high-speed reproduction is performed. The input video code itself is identical with that of the international standard encoding system. Therefore, the international standard image reproducing device can be used. As a result, the specific image reproducing device is unnecessary.

According to the image reproducing device of the present invention, it is possible to dispense with judgement of the type of the interframe encoded image and expansion of the interframe encoded image both, in the forward and the backward directions. As a consequence, expansion is carried out at a high speed so as to enable high-speed reproduction.

In addition, according to the image reproducing device of the present invention, the transmission interval of the intraframe encoded image is constant. Since the type of the encoded image can be judged from the frame interval without relying upon the header, the processing time for expansion can be shortened.

Further, according to the image reproducing device of the present invention, expansion of the input video code is carried out with the motion compensation processing omitted. Thus, the processing time for motion compensation is unnecessary. Accordingly, expansion can be carried out at a high speed so as to enable high-speed reproduction.

Furthermore, according to the image reproducing device of the present invention, the image of the preceding frame is continuously displayed until the cumulative value exceeds the threshold value. Thus, the time required to display the interframe encoded image in that period is saved. Accordingly, expansion processing can be carried out at a high speed so as to enable high-speed reproduction.

Figure 14:
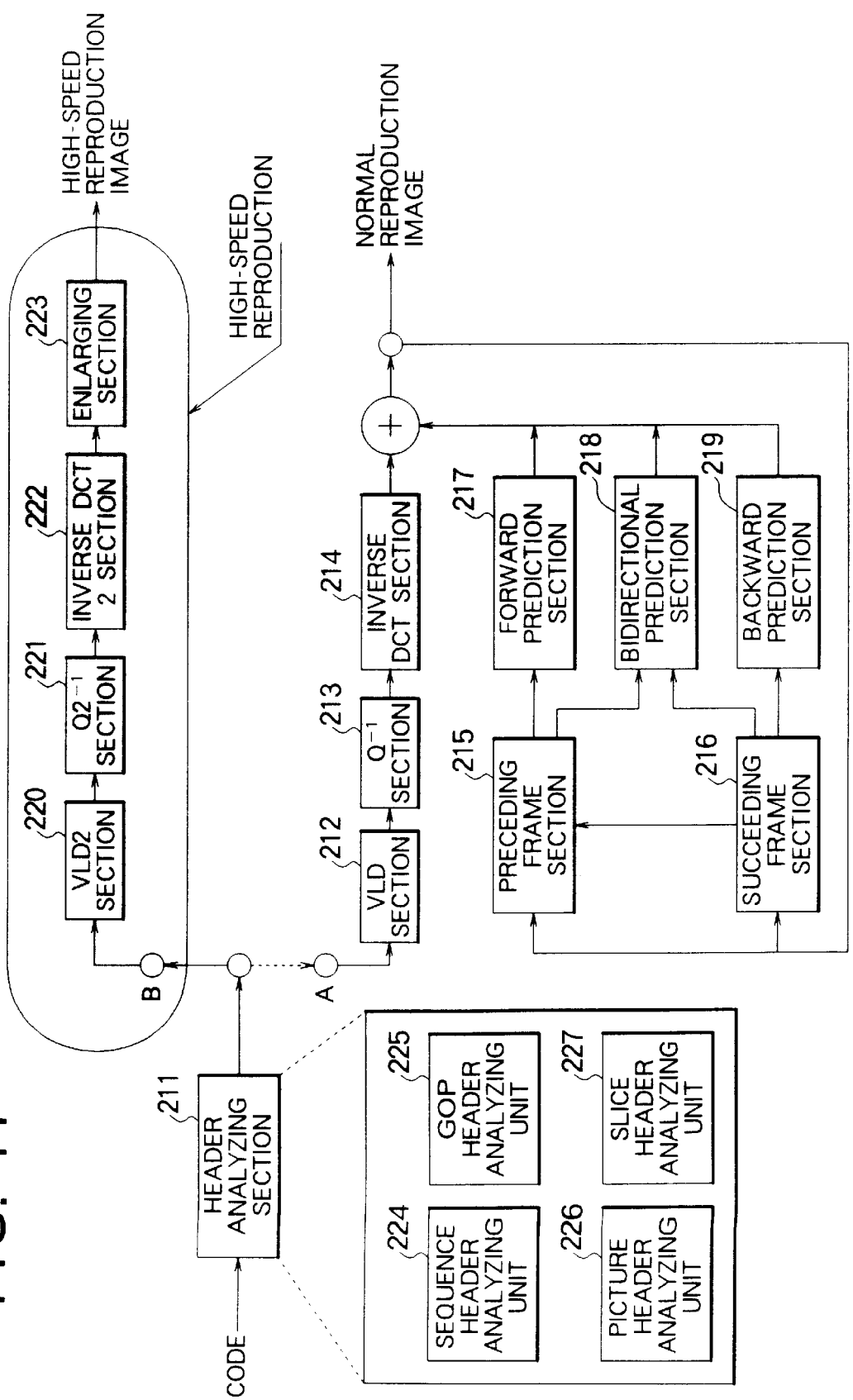
FIG. 14 is a flow diagram of a moving image reproducing device according to a second embodiment of this invention.

Referring now to FIG. 14, description will proceed to a second embodiment of the present invention.

The second embodiment will also be described in conjunction with the MPEG by way of illustration. FIG. 14 is a block diagram of an image reproducing device according to the second embodiment of this invention. The image reproducing device in FIG. 14 comprises a header analyzing section 211, a VLD section 212, a $Q^{-1}$ section 213, an inverse DCT section 214, and a preceding frame section 215, a succeeding frame section 216, a forward prediction section 217, a bidirectional prediction section 218, and a backward prediction section 219. The header analyzing section 211 comprises a sequence header analyzing unit 224, a GOP header analyzing unit 225, a picture header analyzing unit 226, and a slice header analyzing unit 227. The image reproducing device reads a code and the header analyzing section 211 carries out header analysis. At this time, judgement is made whether or not the code has a fixed parameter. If affirmative, high-speed reproduction is carried out. In case of high-speed reproduction, it is assumed that the I picture alone is contained, a slice width is fixed, and an escape code alone is container A VLD2 section 220 decodes a high-efficiency compressed code. A $Q2^{-1}$ section 221 carries out dequantization. An inverse DCT2 section 222 carries out inverse DCT. An enlarging section 223 enlarges and displays a reproduced image. Unless high-speed reproduction, expansion is carried out of three types of codes, namely, the I picture which is an intraframe code, the P picture which is an interframe code in a forward direction alone, and the B picture which is an interframe code both in forward and backward directions.

In case of the I picture, the VLD section 212 carries out decoding. The $Q^{-1}$ section 213 carries out dequantization. The inverse DCT section 214 carries out inverse DCT to calculate pixel values in a block. Thus, video expansion is carried out.

In case of the P picture, the VLD section 212 carries out decoding. The $Q^{-1}$ section 213 carries out dequantization. The inverse DCT section 214 carries out inverse DCT to calculate a differential value of the block. The forward prediction section 217 adds the differential value to a motion compensated block of a preceding frame stored in the preceding frame section 215. Thus, video expansion is carried out.

In case of the B picture, the VLD section 212 carries out decoding. The $Q^{-1}$ section 213 carries out dequantization. The inverse DCT section 214 carries out inverse DCT to calculate a differential value of the block. The bidirectional prediction section 218 or the backward prediction section 219 adds the differential value to a motion compensated block of a preceding frame stored in the preceding frame section 215 and to a motion compensated block of a succeeding frame stored in the succeeding frame section 216. Thus, video expansion is carried out.

Figure 15:
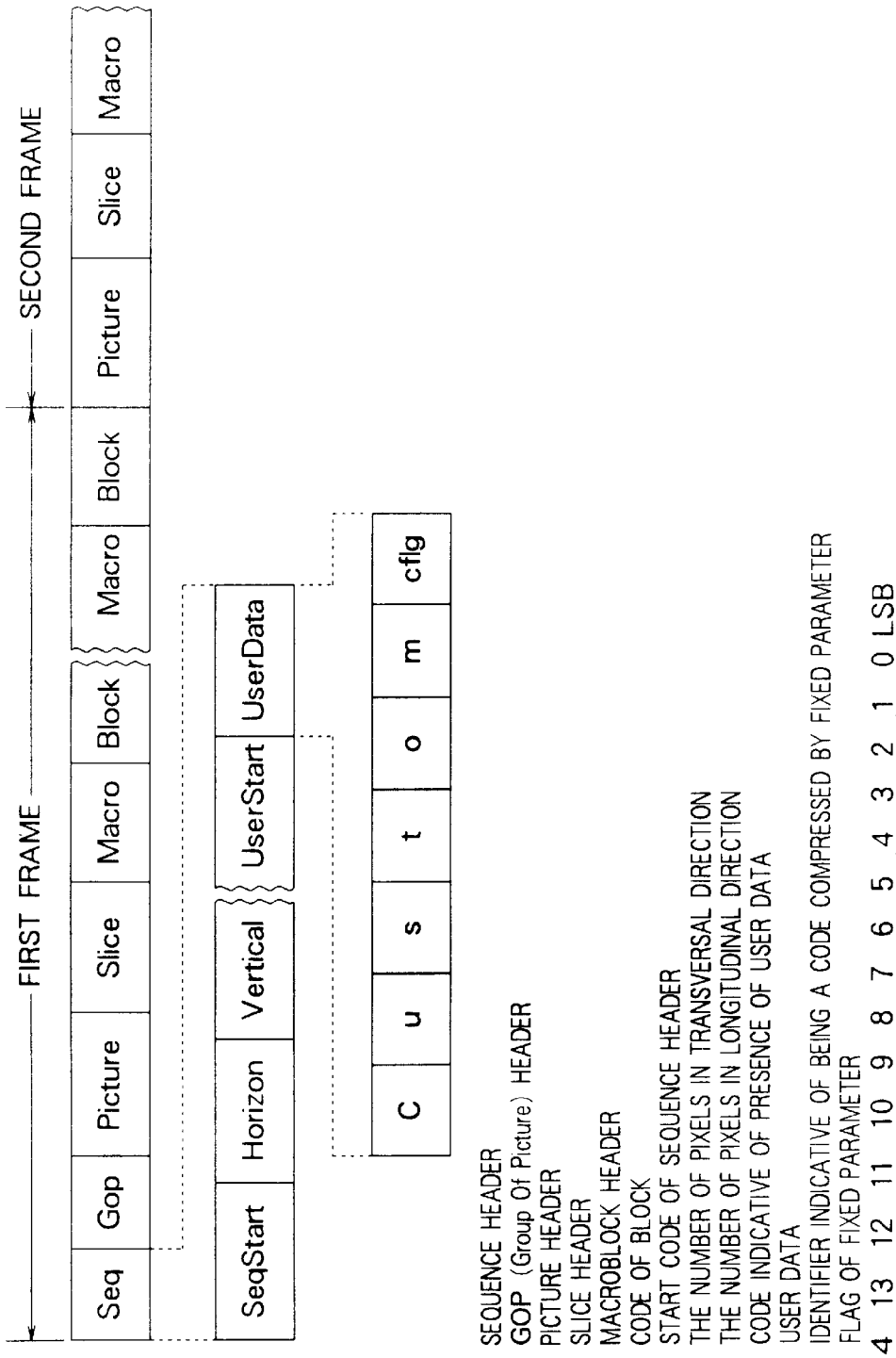
FIG. 15 is a view for illustrating a structure of an MPEG-based code format in relation to the second embodiment of this invention.

FIG. 15 shows a structure of a code format according to the MPEG, which is similar to that mentioned with reference to FIG. 4. The MPEG code comprises, for each layer, (1) a sequence header, (2) a GOP (Group of Picture) header, (3) a picture header, (4) a slice header, (5) a macroblock header, and (6) a code of a block, as illustrated in FIG. 15.

The sequence header has a user data area, as represented by UserData (11), which can be freely defined by a user. In this area, a flag indicating that a parameter is fixed is stored. The user data (11) comprise an identifier "Custom" (12) indicating that the code is compressed by the use of a fixed parameter, and a flag (13) of the fixed parameter. The flag (13) of the fixed parameter comprises 1) a bit indicating enlargement to be carried out upon expansion, 2) a bit indicating that the picture structure is fixed to the I picture alone, 3) a bit indicating that the slice width is fixed to a picture size, 4) a bit indicating cut-off of high-frequency components, and 5) a bit indicating that the code type is fixed to an escape code alone.

Description will now proceed to image reproduction in the image reproducing device according to this embodiment having the above-mentioned structure.

Figures 16A, 16B, 16C:
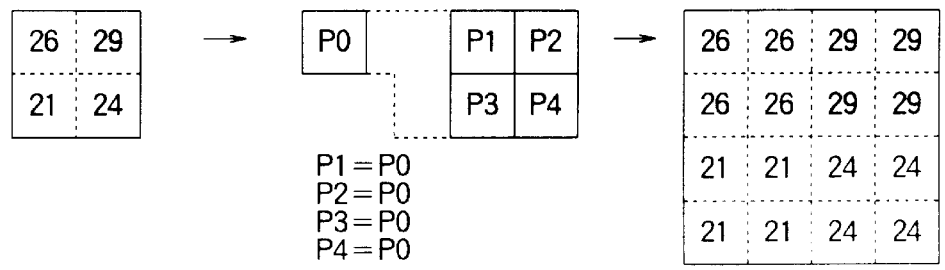
FIG. 16(A) shows each pixel value of; 2×2 pixels for describing enlargement processing according to the second embodiment.
FIG. 16(B) shows processing of transforming one pixel into four pixels for describing enlargement processing according to the second embodiment.
FIG. 16(C) shows each pixel value of 4×4 pixels after enlargement according to the second embodiment.

FIG. 16 is a view for describing enlargement by the image reproducing device. FIG. 16 shows a case where an image of 2×2 pixels is enlarged twice in a longitudinal direction and twice in a transversal direction. FIG. 16(A) shows each pixel value of 2×2 pixels. FIG. 16(C) shows each pixel value of 4×4 pixels after enlargement of twice in a longitudinal direction and twice in a transversal direction. FIG. 16(B) shows processing of transforming one pixel into four pixels. In the case illustrated in FIG. 16, a single pixel is extracted from (A) and transformed into four pixels as shown in (B) to be written in an image (C) after enlarged twice in a longitudinal direction and twice in a transversal direction. For example, an upper right pixel (29) in (A) is subjected to transform in (B) into P1(29), P2(29). P3(29), and P4(29) which are written in a corresponding area in (C).

In the example illustrated in FIG. 16, modification (dither processing) of the pixel values to improve a picture quality is not carried out upon enlargement of twice in a longitudinal direction and twice in a transversal direction. However, such dither processing may be carried out. In this event, enlargement of four times is carried out, for example, assuming that P1=P0+a, P2=P0+b, P3-P0+c, and P4=P0+d (a, b, c, d being given integers) in FIG. 4(B). Although magnification is twice in a longitudinal direction and twice in a transversal direction in this description, another integral multiple such as three times or more may be used.

Figure 17:
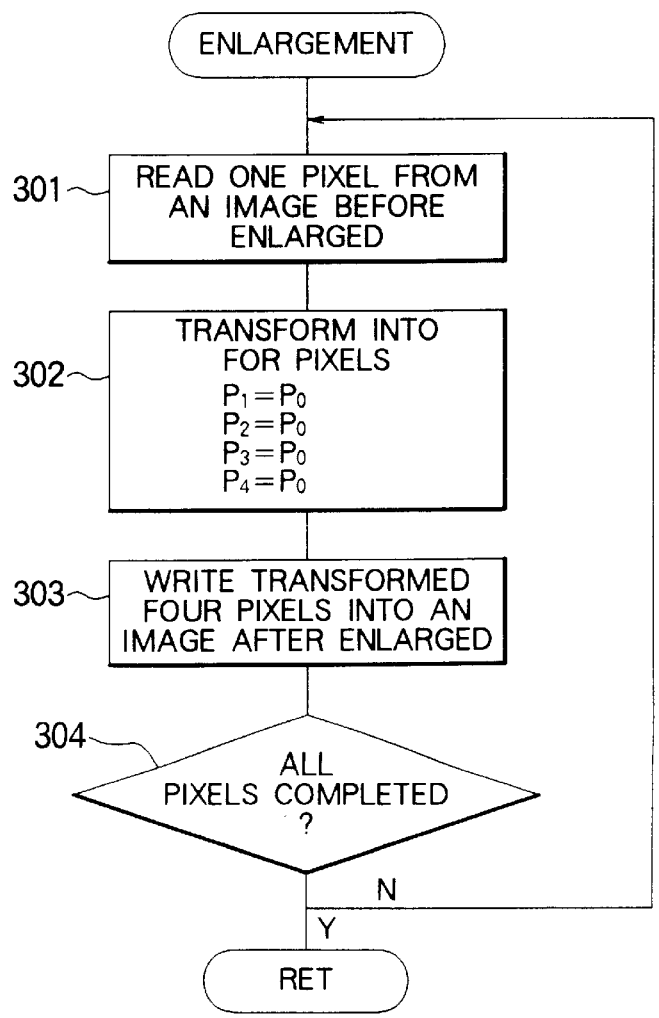
FIG. 17 is a flow chart illustrating an operation of the enlargement processing according to this invention.

FIG. 17 is a flow chart for describing an operation of FIG. 16. As illustrated in FIG. 17, enlargement is carried out as follows. A single pixel is read from an image before enlarged (step 301). The pixel (P0) thus read is transformed into four pixels (P1=P0, P2=P0, P3=P0, P4=P0) (Step 302). The four pixels an transformed are written in an image after enlarged (step 303). Then, judgement is made whether or not all pixels have began processed (step 304). If not, the operation returns to the step 301. Otherwise, the operation comes to an end.

By enlarging and then displaying the expanded image as described above, an expansion time can he shortened, For example, in case of enlargement of twice in a longitudinal direction and twice in a transversal direction, the expansion time is shortened to ¼.

Most part of enlargement processing is occupied by memory read/write operations. On the other hand, expansion processing includes not only memory read/write operations but also multiplications in inverse DCT and in dequantization And bit shift operations in decoding of variable length codes. The memory read/write operations impose less load upon a CPU as compared with the multiplications or the bit shift operations. Even if such enlargement processing is included, processing is carried out at a higher speed in case where enlargement is carried out than in case where no enlargement is carried out.

Figure 18A:
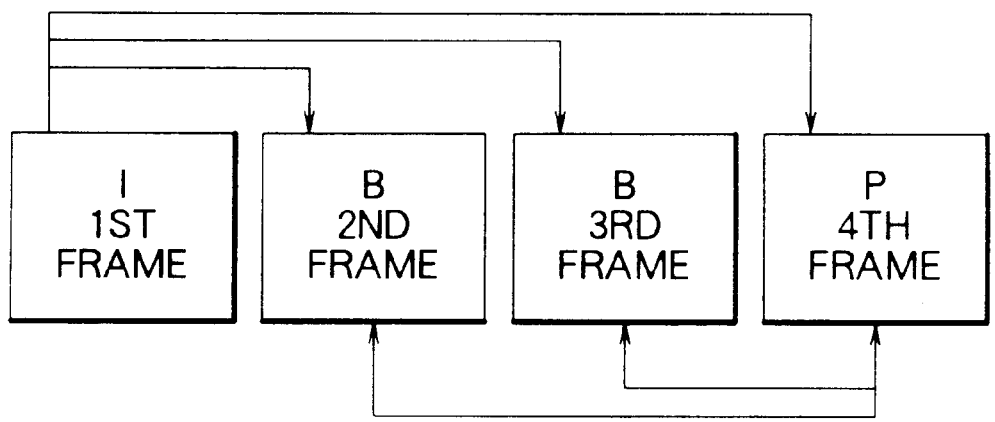
FIG. 18(A) is a view for describing a processing in the image reproducing devise in case where a picture structure is not fixed, assuming that the input video code comprises the I picture, the B picture, the B picture, and the P picture in this order from the first to the fourth frames.
Figure 18B:
FIG. 18(B) is a view for describing a processing in the image reproducing device in case where a picture structure is fixed, assuming that the input video code comprises only the I pictures in the first through the fourth frames according to the second embodiment.

As is similar to FIG. 5, FIG. 18 is a view for describing processing in case where a picture structure is fixed. FIG. 18(A) shows a picture structure comprising the I picture, the P picture, and the B picture. FIG. 18(B) shows a picture structure fixed to the I picture alone. In case of the P picture, it is necessary to carry out forward prediction with reference to an image of a preceding picture. In case of the B picture, it is necessary to carry out backward prediction or bidirectional prediction with reference to an image of a preceding frame or an image of a succeeding frame. In these cases, the processing time is long as compared with the case of the I picture. In the example illustrated in FIG. 18(A), a first frame comprises the I picture and no reference frame is required. A second frame and a third frame comprise B pictures. With reference to an image of the first frame as a preceding frame and to an image of a fourth frame as a succeeding frame, backward prediction or bidirectional prediction is carried out. The fourth frame comprises the P picture. With reference to the image of the first frame as a preceding frame, forward prediction is carried out. In the example illustrated in FIG. 18(B), all of the first through the fourth frames comprise I pictures. It is therefore unnecessary to carry out forward prediction, backward prediction, or bidirectional prediction.

Figure 19A:
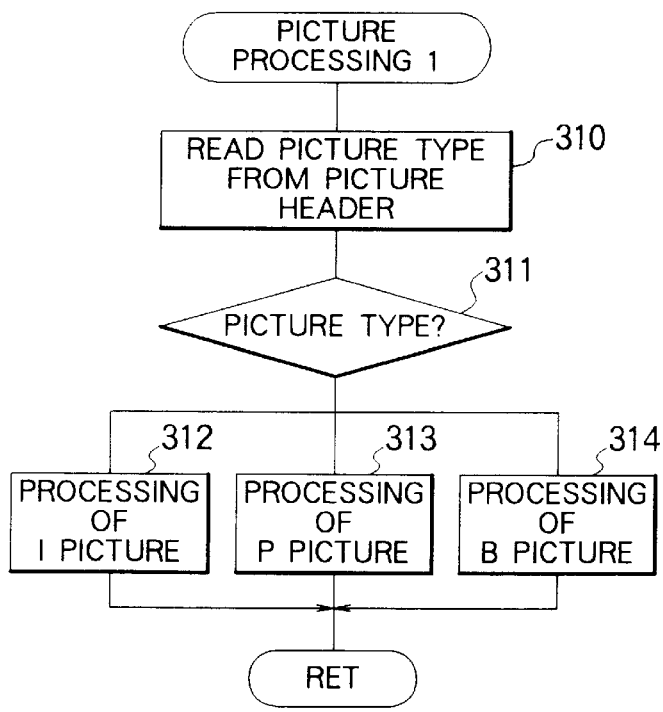
FIG. 19(A) is a flow chart illustrating an operation of processing of the picture structure comprising the I picture, the P picture, and the B picture.
Figure 19B:
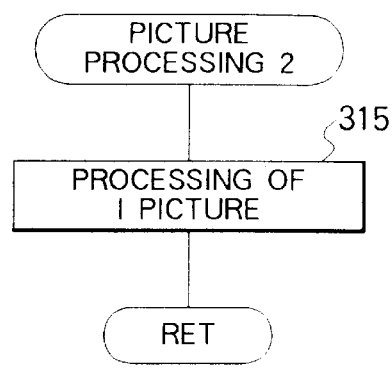
FIG. 19(B) is a flow chart illustrating an operation of processing of the picture structure fixed to the I picture alone.
Figure 19C:
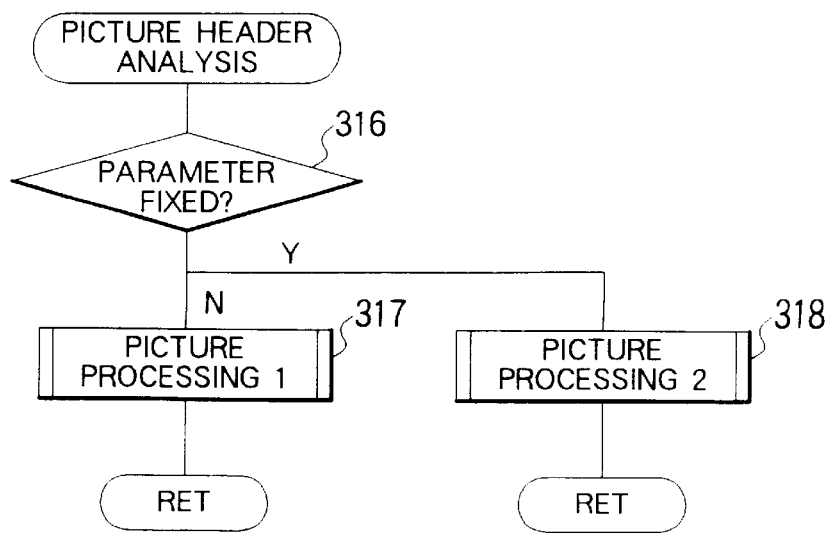

FIG. 19 is a flow chart for describing an operation of FIG. 18. FIG. 19(A) shows processing of the picture structure comprising the I picture, the P picture, and the B picture. FIG. 19(B) shows processing of the picture structure fixed to the I picture alone. FIG. 19(C) shows judgement whether (A) or (B) is to be processed. In picture processing I illustrated in FIG. 19(A), the type of a picture is read from a picture header (step 310). Judgement is made of the type of the picture (step 331). In case of the I picture, processing of the I picture is carried out (step 312). In case of the P picture, processing of the P picture is carried out (step 313). In case of the B picture, processing of the B picture is carried out (step 314). In picture processing 2 illustrated in FIG. 19(B), processing of the I picture is carried out (step 315). In picture header analysis illustrated in FIG. 19(C), judgement is made whether or not a parameter is fixed (step 316). If negative, the picture processing 1 is carried out (step 317). If affirmative, the picture processing 2 is carried out (step 318).

By fixing the picture structure to the I picture alone, the operations of reading and judging the type of the picture from the picture header can be omitted. In addition, forward prediction in the processing of the P picture and backward or bidirectional prediction in the processing of the B picture are omitted. Accordingly, high-speed processing is carried out.

Figure 20A:
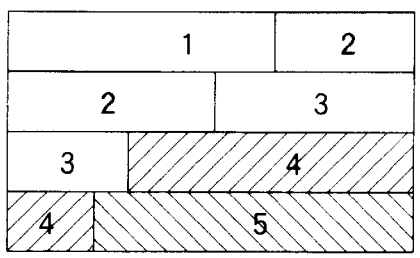
FIG. 20(A) is a view for describing processing on condition that a slice width is not fixed.
Figure 20B:
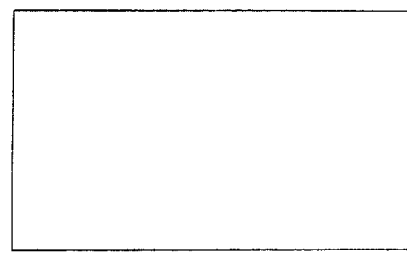
FIG. 20(B) is a view for describing processing on condition that a slice width is fixed to a picture size.

FIG. 20 is a view for describing processing in case where the slice width is fixed. In the MPEC, an image of a single frame is segmented into several areas by 16×16 pixels as a unit. A slice header is inserted at the leading edge of a code in each segmented area to indicate which area of the image it is. FIG. 20(A) shows a case where the slice width is not fixed. FIG. 20(B) shows a case where the slice width is fixed to a picture size. In FIG. 20(A), the image is segmented into five areas (1–5). The slice header is inserted at the leading edge of the code in each of the areas 1 to 5. In FIG. 20(B), the slice width is fixed to the picture size and no segmentation is carried out. Accordingly, only one slice headed is present.

Figure 21A:
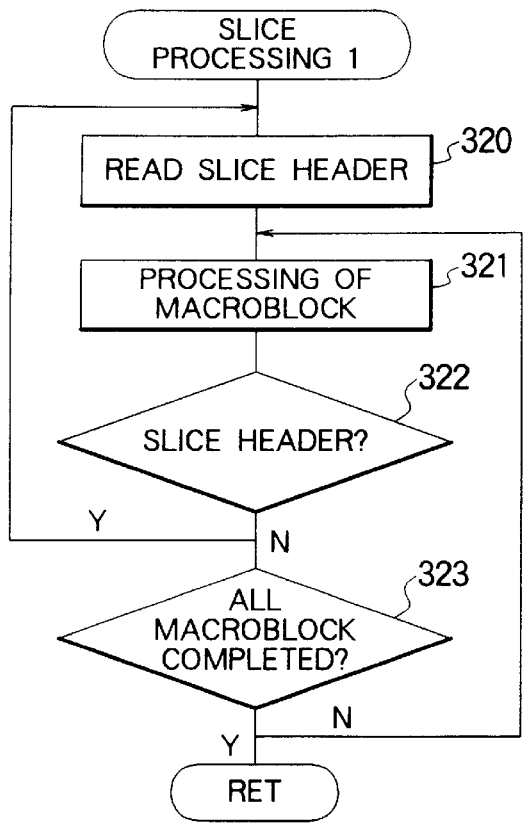
FIG. 21(A) is a flow chart illustrating an operation of slice processing in case where the slice width is not fixed.
Figure 21B:
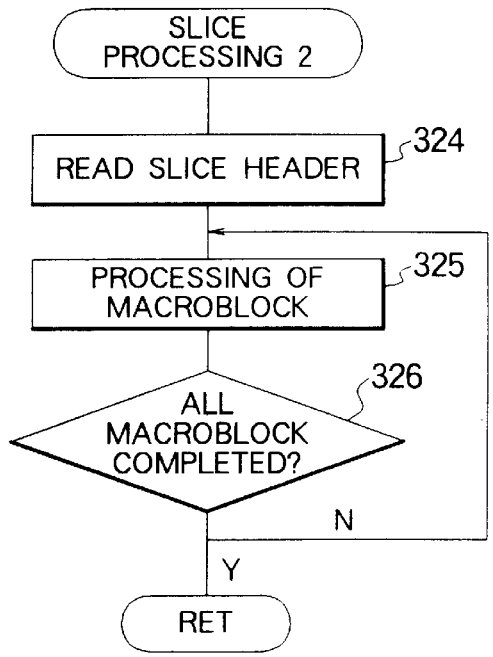
FIG. 21(B) is a flow chart illustrating an operation of slice processing in case where the slice width in fixed to a picture size.
Figure 21C:
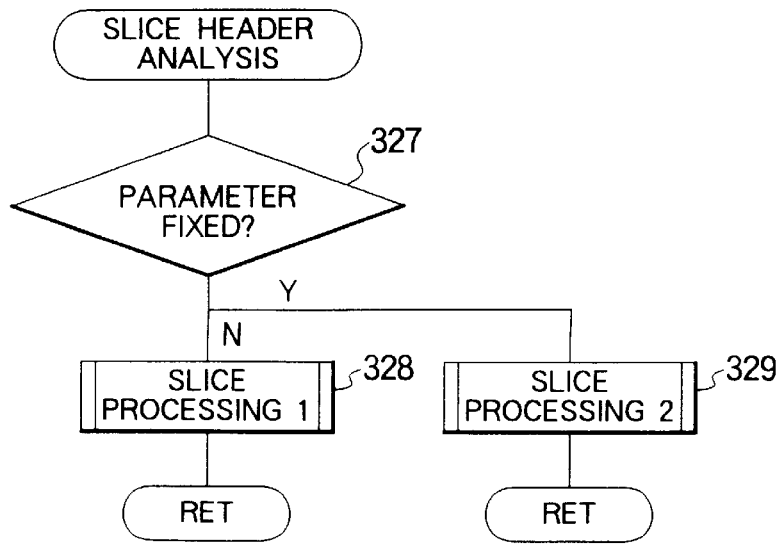

FIG. 21 in a flow chart for describing an operation of FIG. 20. FIG. 21(A) shows processing in case where the slide width is not fixed. FIG. 21(B) shows processing in case where the slice width is fixed to the picture size. FIG. 21(C) shows judgement whether (A) or (B) is to be processed. In slice processing 1 illustration in FIG. 21(A), the slice header is read (step 320). Processing of macroblocks is carried out (step 321). Judgement is made whether or not a next header is a slice header (step 322). If affirmative, the operation returns to the step 20. If not, judgement is made whether or not processing of all macroblocks has been completed (step 323). If not, the operation returns to the step 321. If affirmative, the operation comes to an end. In slice processing 2 illustrated in FIG. 21(B), the slice header is read (step 324). Processing of macroblocks is carried out (step 325). Judgement is made whether or not processing of all macroblocks has been completed (step 326). If not, the operation returns to the step 324. If affirmative, the operation comes to an end. In slice header analysis illustrated in FIG. 21(C), judgement is made whether or not the parameter is fixed (step 327). If not, the slice processing 1 is carried out (step 328). If affirmative, the slice processing 2 is carried out (step 329).

By fixing the slice width to the picture size, it is possible to reduce the number of processing times of reading and analyzing the slice header. Accordingly, high-speed processing is carried out.

FIG. 22 is a view for describing processing in case where inverse DCT is carried out assuming that high frequency components are equal to zero. FIG. 22(A) shows a case where the high frequency components are not assumed to be zero. FIG. 22(B) shows a case where the high frequency components are assumed to be zero. FIG. 22(A) shows a scanning order (zigzag scanning) of frequency components of an 8×8 block from a low frequency to a high frequency. FIG. 22(B) also shows zigzag scanning. However, the twenty-second and subsequent high frequency components are all assumed to be zero. In case of a natural image, video information concentrates to the low frequency components. Accordingly, significant deterioration of the picture quality is not observed even if the high frequency components are assumed to be zero.

Figure 23:
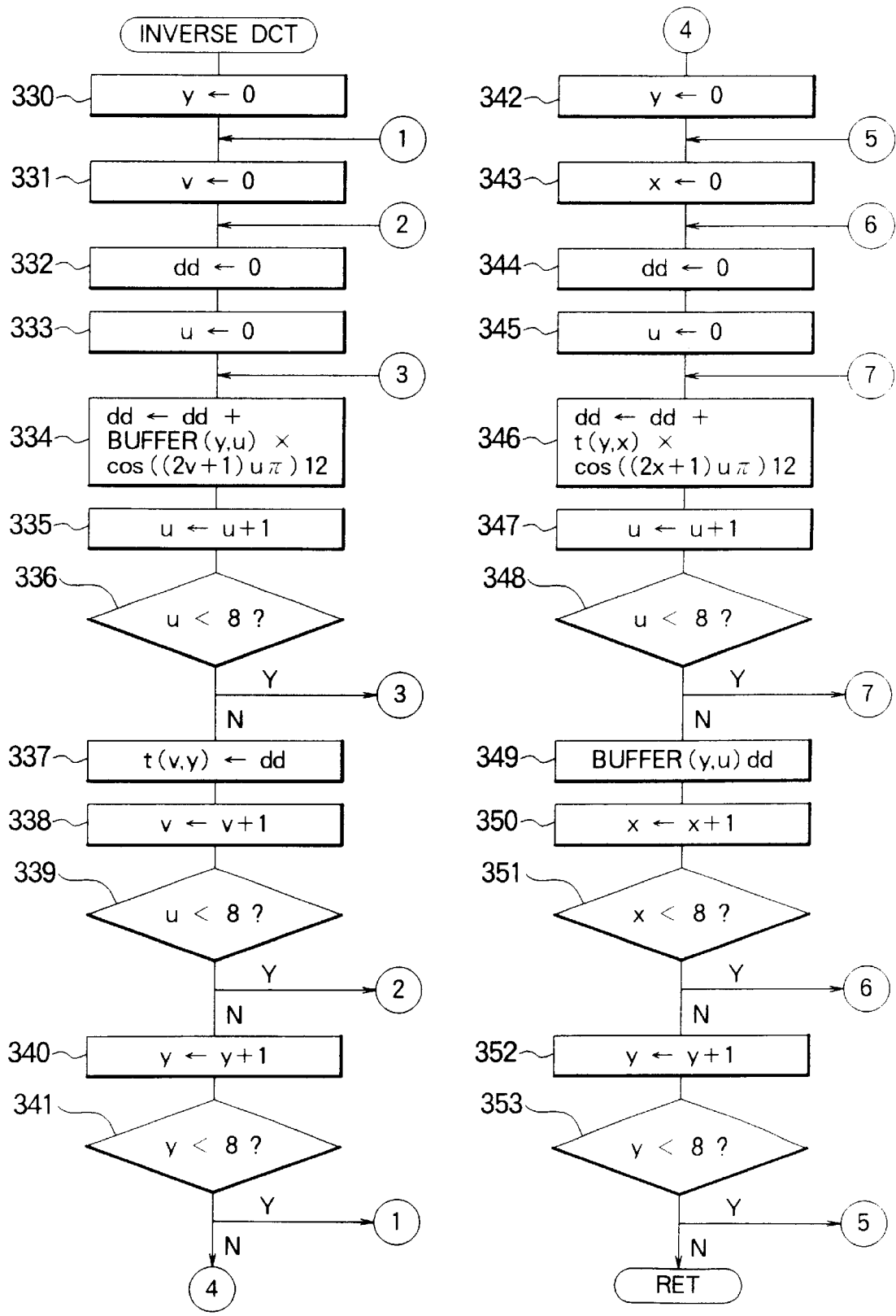
FIG. 23 is a flow chart illustrating an operation of inverse DCT.

FIG. 23 is a flow chart for describing an operation in case where inverse DCT is carried out without assuming that the high frequency components are equal to zero. In the inverse DCT illustrated in FIG. 23, zero is stored in a variable y (step 330). Zero is stored in a variable v (step 331). Zero is stored in a variable dd (step 332). Zero is stored in a variable u (step 333). Then, a product of a buffer Buffer(y, u) of an 8×8 block to be subjected to inverse DCT and an inverse DCT coefficient $\cos((2v+1)u)/2$ is added to the variable dd (step 334). Next, a unity is added to the variable u (step 335). Judgement is made whether or not the value of the variable u is smaller than eight (step 336). If affirmative, the operation returns to the step 334. If not, the value of the variable dd is stored in a temporary storage buffer t(v, y) (step 337). Then, a unity is added to the variable v (step 338). Judgement is made whether or not the value of the variable v is smaller than eight (step 339). If affirmative the operation returns to the step 332. Next, a unity is added to the variable y (step 340). Judgement is made whether or not the variable y is smaller than eight (step 341). If affirmative, the operation returns to the step 331. If not, zero is stored in the variable y (step 342). Then, zero is stored in the variable x (step 343). Zero is stored in the variable dd (step 344). Zero is stored in the variable u (step 345). Next, a product of t(y, u) and $\cos((2x+1)u)/2$ is added to the variable dd (step 346). Then, a unity is added to the variable (step 347). Judgement is made whether or not the value of the variable u is smaller than eight (step 348). If affirmative, the operation returns to the step 346. If not, the value of the variable dd is stored in Buffer(x, y) (step 349). Then, a unity is added to the variable x (step 350). Judgement is made whether or not the value of the variable x is smaller than eight (step 351). If affirmative, the operation returns to the step 344. Next, a unity is added to the variable y (step 352). Judgement in made whether or not the value of the variable y is smaller than eight (step 353). If affirmative, the operation returns to the step 344. If not, the operation comes to an end.

Figure 24:
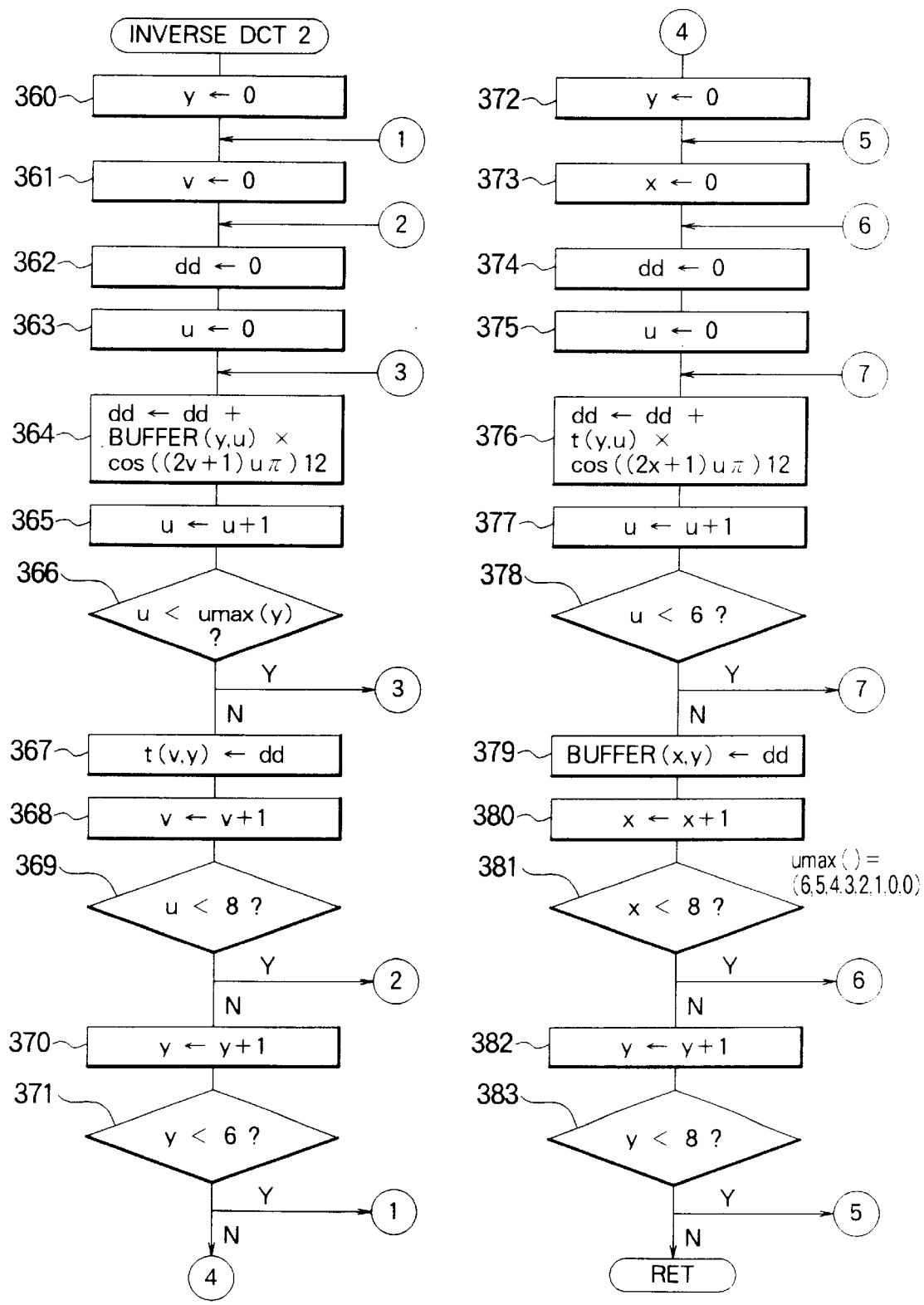
FIG. 24 is a flow chart illustrating an operation of inverse DCT according to the second embodiment.

FIG. 24 is a flow chart for describing an operation in case where inverse DCT in carried out assuming that the high frequency components are equal to zero. FIG. 24 shows an example in which the twenty-second and subsequent frequency components are assumed to be zero. In inverse DCT 2 illustrated in FIG. 24, zero is stored in the variable y (step 360). Zero is stored in the variable v (step 361). Zero is stored in the variable dd (step 362). Zero is stored in the variable u (step 363). Then, a product of the buffer Buffer(y, u) of an 8×8 block to be subjected to inverse DCT and the inverse DCR coefficient $\cos((2v+1)u)/2$ is added to the variable dd (step 364). Then, a unity is added to the variable u (step 365). Judgement is made whether or not the value of the variable u is smaller than the value of umax(y) (step. 366). If affirmative, the operation returns to the step 364. If not, the value of the variable dd is stored in the temporary storage buffer t(v, y) (step 367). Next, a unity is added to the variable v (step 368). Judgement is made whether or not the value of the variable v is smaller than eight (step 369). If affirmative, the operation returns to the step 362. Then, a unity is added to the variable y (step 370). Judgement is made whether or not the value of the variable y is smaller than six (step 371). If affirmative, the operation returns to the step 361. If not, zero is stored in the variable y (stop 372). Next, zero is stored in the variable x (step 373). Zero is stored in the variable dd (step 374). Zero is stored in the variable u (step 375). Then, a product of t(y, u) and $\cot((2x+1)u)/2$ is added to the variable dd (step 376). Subsequently, a unity is added to the variable u (step 377). Judgement is made whether or not the value of the variable u is smaller than six (step 378). If affirmative, the operation returns to the step 376. If net, the value of the variable dd is stored in Buffer(x, y) (Step 379). Then, a unity is added to the variable x (step 380). Judgement is made whether or not the value of the variable x is smaller than eight (step 381). If affirmative, the operation returns to the step 374. Next, a unity is added to the variable y (step 382). Judgement is made whether or not the variable y is smaller than eight (step 383). If affirmative, the operation returns to the step 374. If not, the operation comes to an end.

Although the twenty-second and subsequent components are assumed to be zero in the example illustrated in FIG. 24, any value between 1 and 64 may be selected in dependence upon the processing ability not the reproducing unit.

In case where the high frequency components are not assumed to be zero, the number of times of multiplication is equal to 8×8×8×2=1024. When the twenty-second and subsequent frequency components are assumed to be zero, the number of times of multiplication is equal to 8×(6+5+4+3+2+1)×6+6×8×8=510. Thus, processing is performed at a high speed when the inverse DCR is carried out assuming that the high frequency components are equal to zero.

FIG. 25 shows a structure of an escape code. The MPEG prescribes the escape code of a fixed pitch length. The escape code comprises (1) a code (000001) indicative of being the escape code, (2) a run length (the number of invalid coefficients), and (3) a level (the value of an effective coefficient: −128 to +128)

FIG. 26 is a table showing examples of an ordinary code and the escape code. As illustrated in FIG. 26, the ordinary codes have a variable length between 2 and 17 bits. On the other hand, all escape codes have a fixed length of 20 bits.

Figure 27A:
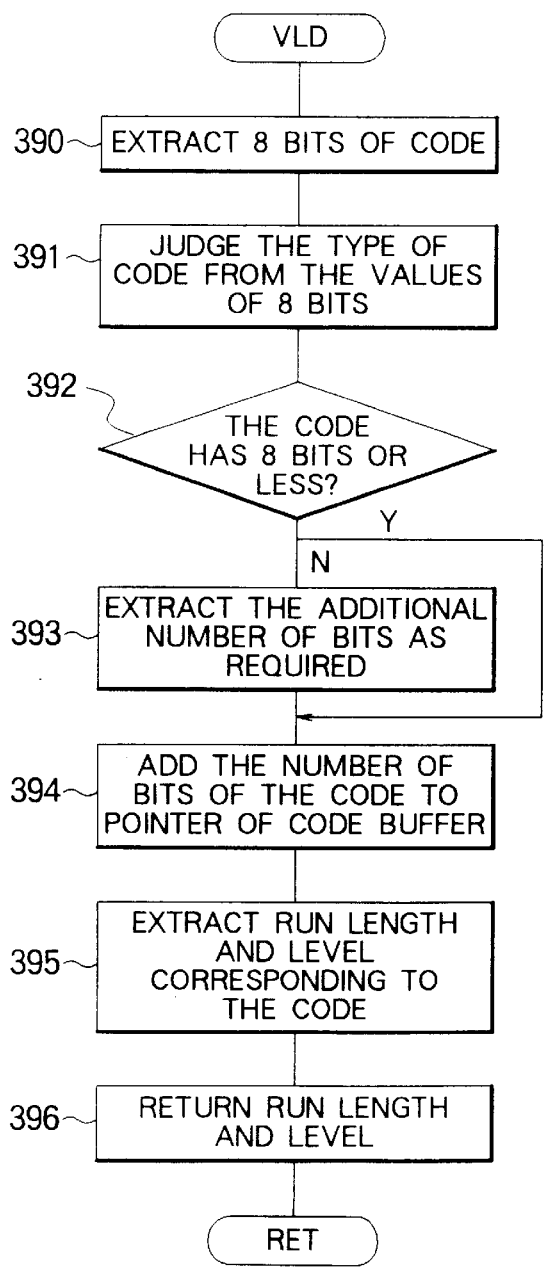
FIG. 27(A) is a flow chart illustrating an operation of VLD for showing processing of the ordinary code.
Figure 27B:
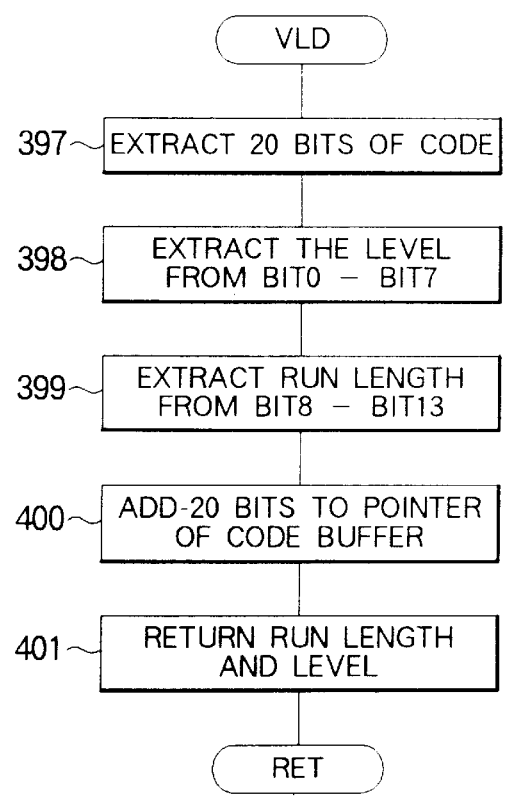
FIG. 27(B) is a flow chart illustrating an operation of VLD for showing processing in case where the type of the code is fixed to the escape code alone.

FIG. 27 is a flow chart for describing an operation of VLD. FIG. 27(A) shows processing of the ordinary code. FIG. 27(B) shows processing in case where the type of the code is fixed to the escape code alone. In the VLD illustrated in FIG. 27(A), eight bits are picked up from the code (step 390). From the values of the eight bits, judgement in made of the type of the code (step 391). Judgement is made whether or not the code consists of eight or less number of bits (step 392). If affirmative, the operation proceeds to a step 594. If not, an additional number of bits as required are picked up (step 393). The number of bits of the code is added to a pointer of a code buffer (step 394). The run length and the level corresponding to the code are picked up (step 395). The run length and the level are returned (step 396). In the VLD 2 illustrated in FIG. 27(B), eight bits are picked up from the code (step 397). The level in extracted from the bit 0 through the bit 7 (step 398). The run length is extracted from the bit 8 through the bit 13 (step 399). Twenty bits are added to the pointer of the code buffer (step 400). The run length and the level are returned (step 401).

Thus, in case of the ordinary code, it is necessary to detect the number of bits of the code and to carry out processing in dependence upon the number. On the other hand, in case of the escape code alone, it is unnecessary to detect the number of bits of the code because the code has a fixed length of 20 bits. Thus, high-speed processing is carried out.

As described above, it is possible according to the second embodiment of this invention to carry out expansion with the parameter fixed. Therefore, high-speed reproduction is carried out with deterioration of the picture quality suppressed as small as possible in correspondence to the processing ability of the reproducing unit. In addition, no specific reproducing unit is required because compatibility with an international standard encoding system is assured.

While this invention has thus far been described in specific conjunction with only several embodiments thereof, it will now be readily possible for one skilled in the art to put this intention into effect in various other manners. For example, in the above-described embodiments, the processing upon transmission of both the I picture and the P picture may alternatively be fixed to only the P picture. Moreover, the processing with picture structure fixed, the processing with motion compensation fixed and display renewal/non-renewal processing may be carried out independently or in combination of two or all of them. Furthermore, in the foregoing embodiments, description has been made in conjunction with the MPEG by way of example, however, this invention is not restricted thereto but is applicable to reproduction of the input video code encoded by other DCT-based encoding systems such as JPEG.

What is claimed is:

1. An image reproducing device comprising:

expanding and reproducing means for expanding and reproducing a video code comprising an intraframe encoded image and one or more types of interframe encoded images which are multiplexed together with a header having a fixed parameter identifier identifying one of said types of interframe encoded images when only said one type of interframe encoded images is multiplexed with said intraframe encoded image, said intraframe encoded image being prepared by segmenting an image into a plurality of blocks and by compressing and encoding each block by the use of discrete cosine transform, said interframe encoded image being prepared by searching for a particular block at which a difference is smallest between a current frame and a preceding frame in a time sequential order, by carrying out motion compensation on each said block, and by compressing and encoding a differential value between each block of said current frame and a motion compensated block by the use of discrete cosine transform;

header analyzing means for judging, with reference to said header contained in said video code supplied as an input video code, whether or not said input video code exclusively comprises said intraframe encoded image and an interframe encoded image fixed to said one type of interframe encoded image identified by said fixed parameter identifier; and expansion processing means for detecting that said input video code is said intraframe encoded image when said header analyzing means judges that said input video code is such a code that exclusively comprises said intraframe encoded image and said interframe encoded image that is fixed to one type of interframe encoded image identified by said fixed parameter identifier and in response to said detection, for carrying out expansion processing of said intraframe encoded image when it is detected that said input video code is said intraframe encode image, and for carrying out expansion processing of said interframe encoded image when it is detected that said input video code is not said intraframe encoded image.

2. An image reproducing device as claimed in claim 1, wherein said input video code has a structure in which a transmission interval between said intraframe encoded image and a next intraframe encoded image is constant, said interframe encoded image being transmitted within said transmission interval.

3. An image reproducing device as in claim 1 or 2, wherein the interframe encoded image is a predictive coded picture image.

* * * * *